US011350185B2

(12) United States Patent
Sangoli

(10) Patent No.: US 11,350,185 B2
(45) Date of Patent: *May 31, 2022

(54) TEXT-TO-AUDIO FOR INTERACTIVE VIDEOS USING A MARKUP LANGUAGE

(71) Applicant: Bank of America Corporation, Charlotte, NC (US)

(72) Inventor: Shankar Sangoli, Langhorne, PA (US)

(73) Assignee: Bank of America Corporation, Charlotte, NC (US)

(*) Notice: Subject to any disclaimer, the term of this patent is extended or adjusted under 35 U.S.C. 154(b) by 200 days.

This patent is subject to a terminal disclaimer.

(21) Appl. No.: 16/714,388

(22) Filed: Dec. 13, 2019

(65) Prior Publication Data

US 2021/0185412 A1   Jun. 17, 2021

(51) Int. Cl.
*H04N 21/8545* (2011.01)
*G06T 13/80* (2011.01)
*H04N 21/8543* (2011.01)
*H04N 21/81* (2011.01)

(52) U.S. Cl.
CPC ......... *H04N 21/8545* (2013.01); *G06T 13/80* (2013.01); *H04N 21/8146* (2013.01); *H04N 21/8543* (2013.01)

(58) Field of Classification Search
CPC .......... H04N 21/8545; H04N 21/8146; H04N 21/8543; G06T 13/80
USPC ........................................................ 725/32
See application file for complete search history.

(56) References Cited

U.S. PATENT DOCUMENTS

| 5,111,409 A | 5/1992 | Gasper |
| 5,983,190 A * | 11/1999 | Trower, II ................. G06F 8/00 704/275 |
| 6,173,317 B1 | 1/2001 | Chaddha et al. |
| 6,174,170 B1 | 1/2001 | Olmedo |

(Continued)

FOREIGN PATENT DOCUMENTS

| EP | 2385520 A3 | 11/2011 |
| JP | 2004152063 A | 5/2004 |

(Continued)

OTHER PUBLICATIONS

Sangoli, S., "Synchronizing Text-To-Audio With Interactive Videos in the Video Framework," U.S. Appl. No. 16/714,495, filed Dec. 13, 2019, 61 pages.

(Continued)

*Primary Examiner* — Alfonso Castro

(57) ABSTRACT

A device configured to receive a video request that includes animation instructions for a video scene. The animation instructions identify one or more animations associated with the video scene. The device is further configured to identify a first animation from the one or more animations associated with the video scene and to determine that the first animation is configured for text-to-audio. The device is further configured to identify text associated with the first animation and to convert the text associated with the first animation into an audio sample. The device is further configured to associate the audio sample with an animation identifier for the first animation in an audio sample buffer. The device is further configured to associate a timestamp with a source scene identifier for the video scene and the animation identifier for the first animation in the video timing map.

17 Claims, 12 Drawing Sheets

(56) References Cited

U.S. PATENT DOCUMENTS

| | | | |
|---|---|---|---|
| 6,181,351 B1 | 1/2001 | Merrill et al. | |
| 6,260,011 B1 | 7/2001 | Heckerman et al. | |
| 6,434,524 B1* | 8/2002 | Weber | H04L 29/06 |
| | | | 704/257 |
| 6,456,973 B1 | 9/2002 | Fado et al. | |
| 6,554,703 B1 | 4/2003 | Bussick et al. | |
| 6,789,105 B2 | 9/2004 | Ludwig et al. | |
| 6,933,928 B1 | 8/2005 | Lilienthal | |
| 6,961,895 B1 | 11/2005 | Beran et al. | |
| 7,013,154 B2 | 3/2006 | Nowlan | |
| 7,058,889 B2 | 6/2006 | Trovato et al. | |
| 7,091,976 B1 | 8/2006 | Ostermann et al. | |
| 7,508,393 B2 | 3/2009 | Gordon et al. | |
| 7,739,280 B2 | 6/2010 | Aravamudan et al. | |
| 7,788,100 B2* | 8/2010 | Slotznick | G10L 13/00 |
| | | | 704/270.1 |
| 8,903,723 B2 | 12/2014 | Kurzweil et al. | |
| 9,031,493 B2 | 5/2015 | Morton et al. | |
| 9,280,906 B2 | 3/2016 | Arora et al. | |
| 9,317,486 B1 | 4/2016 | Story, Jr. et al. | |
| 9,532,116 B2 | 12/2016 | Terpe | |
| 9,620,104 B2 | 4/2017 | Naik et al. | |
| 9,626,955 B2 | 4/2017 | Fleizach et al. | |
| 9,633,674 B2 | 4/2017 | Sinha | |
| 9,703,781 B2 | 7/2017 | Hwang et al. | |
| 9,792,027 B2 | 10/2017 | Story, Jr. et al. | |
| 9,934,775 B2 | 4/2018 | Raitio et al. | |
| 10,356,243 B2 | 7/2019 | Sanghavi et al. | |
| 2004/0220812 A1 | 11/2004 | Bellomo et al. | |
| 2004/0220926 A1 | 11/2004 | Lamkin et al. | |
| 2006/0041428 A1 | 2/2006 | Fritsch et al. | |
| 2006/0074683 A1* | 4/2006 | Betarbet | G10L 13/00 |
| | | | 704/270.1 |
| 2008/0027726 A1* | 1/2008 | Hansen | G10L 13/00 |
| | | | 704/260 |
| 2009/0138906 A1 | 5/2009 | Eide et al. | |
| 2010/0122193 A1 | 5/2010 | Lange et al. | |
| 2010/0324895 A1 | 12/2010 | Kurzweil et al. | |
| 2011/0264451 A1 | 10/2011 | Hoepfinger et al. | |
| 2011/0320204 A1 | 12/2011 | Locker et al. | |
| 2012/0084807 A1 | 4/2012 | Thompson et al. | |
| 2012/0046947 A1 | 12/2012 | Fleizach | |
| 2012/0310643 A1 | 12/2012 | Labsky et al. | |
| 2012/0310649 A1* | 12/2012 | Cannistraro | G06F 16/685 |
| | | | 704/260 |
| 2013/0232413 A1 | 9/2013 | Cho | |
| 2013/0268826 A1 | 10/2013 | Nowakowski et al. | |
| 2013/0304465 A1 | 11/2013 | Henry et al. | |
| 2014/0058734 A1 | 2/2014 | Bakis et al. | |
| 2017/0032562 A1* | 2/2017 | Block | H04N 21/4316 |
| 2020/0027440 A1* | 1/2020 | Kilgore | G10L 13/08 |

FOREIGN PATENT DOCUMENTS

| | | |
|---|---|---|
| WO | 2010081225 A1 | 7/2010 |
| WO | 2012129445 A2 | 9/2012 |

OTHER PUBLICATIONS

Long, M. C., "Interactive Video: The New Content Marketing Must-Have," Aug. 31, 2015, 2 pages.

* cited by examiner

```
Source scene ID
    134
┌──────────────────┐
│ Source scene ID  │
└──────────────────┘
metadata: {
    ┌─────────────────────────────────────────────────────────────────┐
    │ HTML: 'HTML string/DOM element/jQuery object',//HTML instructions│   ── HTML Instructions
    └─────────────────────────────────────────────────────────────────┘      202
    ┌─────────────────────────────────────────────────────────────────┐
    │ animations: [{                    //animations instructions      │   ── Animation Instructions
    │     e: '.element-selector'                                       │      204
    │     p: {left:'0%'},                                              │
    │     o: {duration: 1000}                                          │
    │ }]                                                               │
    └─────────────────────────────────────────────────────────────────┘
    ┌─────────────────────────────────────────────────────────────────┐
    │ audioSource : '',                 //audio source                 │   ── Audio Instructions
    └─────────────────────────────────────────────────────────────────┘      206
    ┌─────────────────────────────────────────────────────────────────┐
    │ transitions: {                    //transition effect            │   ── Transition Effect Instructions
    │     enter: {                                                     │      208
    │         effect: 'slideLeft',                                     │
    │         duration: 500                                            │
    │     },                                                           │
    │     exit: {                                                      │
    │         effect: 'slideUp',                                       │
    │         duration: 500                                            │
    │     }                                                            │
    │ }                                                                │
    └─────────────────────────────────────────────────────────────────┘
}
```

⟵ Source Scene 132

FIG. 2

```
{
    e: '.elem1-selector',
    p: {scale: 2},              /⁓ 1002    /⁓ 902
    o: {duration: 2000, parallel: true, TextToAudio: true}
}
```
802D brace covers the first block.

```
{
    e: '.elem2-selector',
    p: {scale: 2},              /⁓ 1002    /⁓ 902
    o: {duration: 2000, parallel: true, TextToAudio: [Element Reference]}}
}
```
802E brace covers the second block.

| Audio Sample 1 | Animation Identifier 1 |
| Audio Sample 2 | Animation Identifier 2 |
| Audio Sample 3 | Animation Identifier 5 |
| Audio Sample 4 | Animation Identifier 8 |

610 brace on left; 1102 brace on right.

```
{
    "map": {
                    1202        134         1102
        {"t": 0,  "d": {"sld": 1, "ald": 1}},
        {"t": 2,  "d": {"sld": 1, "ald": 2}},
        {"t": 3,  "d": {"sld": 1, "ald": 3}},
        {"t": 4,  "d": {"sld": 1, "ald": 4}},
        {"t": 8,  "d": {"sld": 1, "ald": 5}},
        {"t": 14, "d": {"sld": 2, "ald": 6}},
        {"t": 16, "d": {"sld": 2, "ald": 7}},
        {"t": 20, "d": {"sld": 2, "ald": 8}},
        {"t": 21, "d": {"sld": 2, "ald": 9}},
    }
    "totalTime": 14300
}
```

*FIG. 12*

TEXT-TO-AUDIO FOR INTERACTIVE VIDEOS USING A MARKUP LANGUAGE

TECHNICAL FIELD

The present disclosure relates generally to creating interactive videos, and more specifically to creating interactive videos using a markup language.

BACKGROUND

A web platform provides a computer network that enables users to access information from multiple sources. However, users typically have to visit multiple areas within the web platforms to gather what is meaningful to them. In existing systems, users do not have the capability to define their own personalized web content and access the web content without being redirected to multiple areas within the web platform. For example, a user may want to trade (e.g., buy or sell) a particular stock on a web platform. The user may go to a first place of the web platform to view statistics such as past performance of the stock, go to a second place of the web platform to check whether the user has enough account balance to trade the stock, and then go to a third place of the web platform to watch a video on how to conduct a trade on the stock. This process is not only inefficient, but it also poses several technical challenges. For example, this process constantly consumes network resources and bandwidth while user visits the multiple locations within the web platform. This process also consumes computing resources to process all the user's requests to visit the multiple locations in the web platform. In addition, this process also significantly increases the time it takes for the user to obtain the meaningful information which degrades the user's satisfaction with the web platform.

SUMMARY

A web platform provides a computer network that enables users to access information from multiple sources. However, users typically have to visit multiple areas within the web platforms to gather what is meaningful to them. In existing systems, users do not have the capability to define their own personalized web content and access the web content without being redirected to multiple areas within the web platform. For example, a user may want to trade (e.g., buy or sell) a particular stock on a web platform. The user may go to a first place of the web platform to view statistics such as past performance of the stock, go to a second place of the web platform to check whether the user has enough account balance to trade the stock, and then go to a third place of the web platform to watch a video on how to conduct a trade on the stock. This process is not only inefficient, but it also poses several technical challenges. For example, this process constantly consumes network resources and bandwidth while user visits the multiple locations within the web platform. This process also consumes computing resources to process all the user's requests to visit the multiple locations in the web platform. In addition, this process also significantly increases the time it takes for the user to obtain the meaningful information which degrades the user's satisfaction with the web platform.

The system disclosed herein provides several technical advantages which include creating an interactive video in the form of a series of HTML pages. Creating a video in the form of a series of HTML pages is an unconventional technique which allows a viewer to interact with HTML links or interactive HTML elements that are embedded in the HTML pages of the video. The interactive video includes interactive HTML elements that allow users to interact with the video. Allowing users to interact with the video facilitates increasing the efficiency of the disclosed system because the users do not need to go to different places (e.g., web pages) or be redirected to find the information they want. Instead, users can stay on and interact with the video to find the information they want. By doing this, users can avoid bouncing around multiple places and the system can avoid reloading or rebuffering the same web pages or content. This conserves network bandwidth and computing resources, such as memories and processing power.

Existing systems usually present a video in the format of MP4, MOV, AVI, among others. Rendering and streaming a video as a series of HTML pages requires less computing resources and network resources than rendering and streaming videos having other formats such as MP4, MOV, and AVI. This facilitates decreasing the loading and buffering time of the web content, reducing response time of the disclosed system, and conserving computing resources and network resources.

Unlike traditional videos where a progress bar has a one-to-one correspondence between time and video frames, an interactive HTML videos may comprise animations, delays, and interactive HTML elements that have different timing characteristics. These elements have variable timing characteristics because these elements may occur sequentially, in parallel, or may even be optional. These variable timing characteristics mean that interactive HTML videos do not follow a linear timeline or have one-to-one correspondence between time and video scenes. The disclosed system is configured to generate progress bar for an interactive HTML video which provides a user interface that links video scenes and other elements in an interactive HTML video.

In one embodiment, the system includes a device that is configured to receive a video request that includes animation instructions for a video scene. The animation instructions identify one or more animations associated with the video scene that are configured for text-to-audio. The device is further configured to identify a first animation from the one or more animations associated with the video scene and to determine that the first animation is configured for text-to-audio. The device is further configured to identify text associated with the first animation and to convert the text associated with the first animation into an audio sample. The device is further configured to associate the audio sample with an animation identifier for the first animation in an audio sample buffer. The audio buffer provides a mapping between animations (e.g. animation identifiers) and audio samples. The device is further configured to associate a timestamp with a source scene identifier for the video scene and the animation identifier for the first animation in the video timing map. This process allows the device to generate a video timing map for rendering an interactive video that includes animations configured with text-to-audio.

In another embodiment, the system includes a device that is configured to determine a time on a progress bar and to identify a timestamp in the video timing map based on the time on the progress bar. The device is further configured to identify a source scene identifier corresponding with the identified timestamp and to play a video scene corresponding with the identified source scene identifier. The device is further configured to identify a first animation identifier corresponding with the identified timestamp and to play a first animation associated with the first animation identifier.

The device is further configured to determine that the first animation identifier is present in the audio sample buffer, to identify an audio sample associated with the first animation identifier, and to play the identified audio sample. This process allows the device to play interactive videos that includes animations configured with text-to-audio.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 is an embodiment of a source scene for an interactive video;

FIG. 10 is an example of a portion of a video request with animations configured to play in parallel;

FIG. 11 is an example of an audio sample buffer for an interactive video;

FIG. 12 is an example of a video timing map for an interactive video;

DETAILED DESCRIPTION

The system disclosed herein provides several technical advantages which include creating an interactive video in the form of a series of HTML pages. Creating a video in the form of a series of HTML pages is an unconventional technique which allows a viewer to interact with HTML links or interactive HTML elements that are embedded in the HTML pages of the video. Existing systems and methods usually present a video in the format of MP4, MOV, AVI, among others. Rendering and streaming a video as a series of HTML pages requires less computing resources and network resources than rendering and streaming videos having other formats such as MP4, MOV, and AVI. This facilitates decreasing the loading and buffering time of the web content, reducing response time of the disclosed system 100, and conserving computing resources and network resources.

Unlike traditional videos where a progress bar has a one-to-one correspondence between time and video frames, an interactive HTML videos may comprise animations 164, delays, and interactive HTML elements that have different timing characteristics. These elements have variable timing characteristics because these elements may occur sequentially, in parallel, or may even be optional. These variable timing characteristics mean that interactive HTML videos do not follow a linear timeline or have one-to-one correspondence between time and video scenes. The disclosed system is configured to generate progress bar for an interactive HTML video. The progress bar provides a user interface that links video scenes and other elements in an interactive HTML video.

Figure 1:
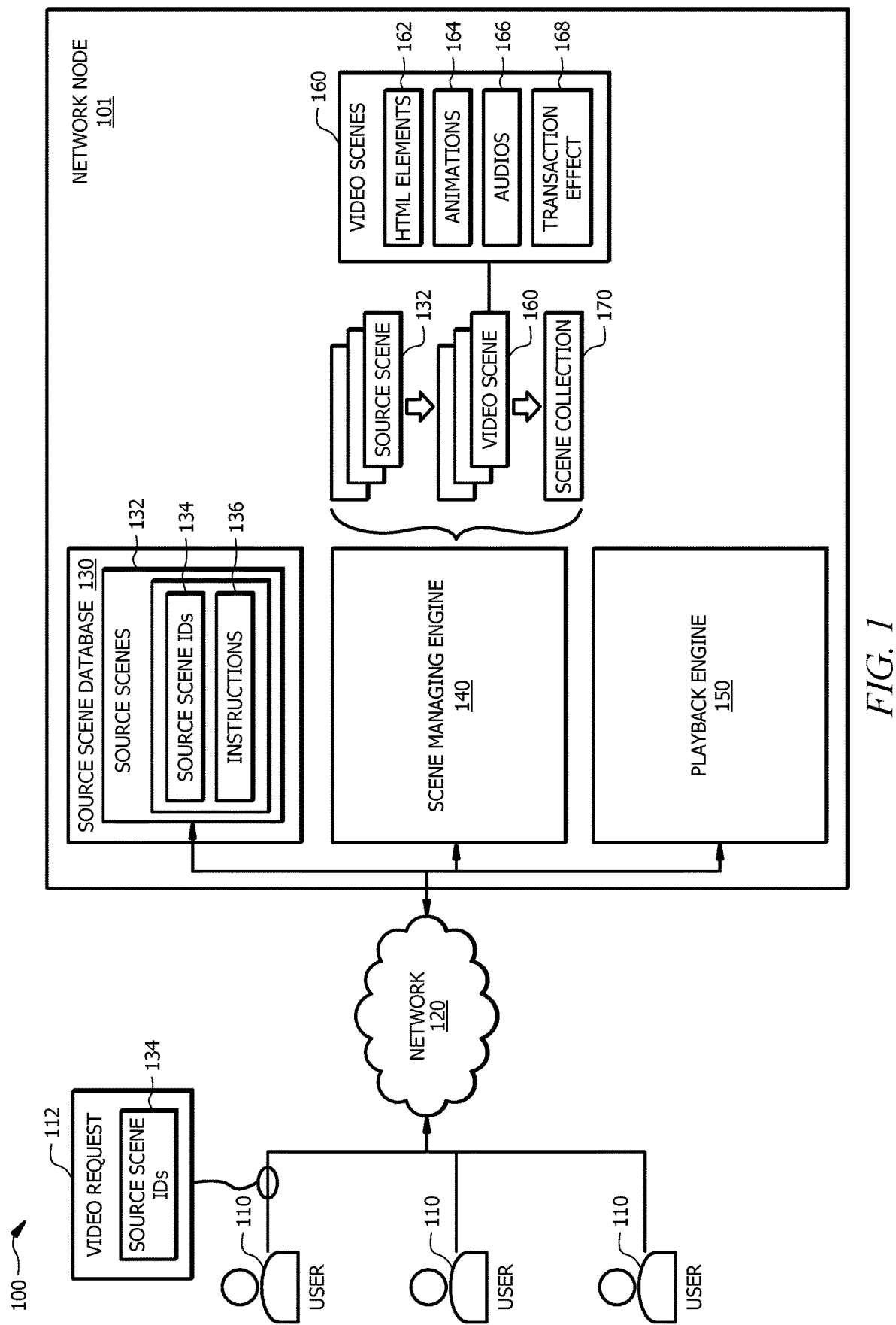
FIG. 1 is a schematic diagram of an embodiment of a system for creating an interactive video using a markup language according to the present disclosure.
Figure 3:
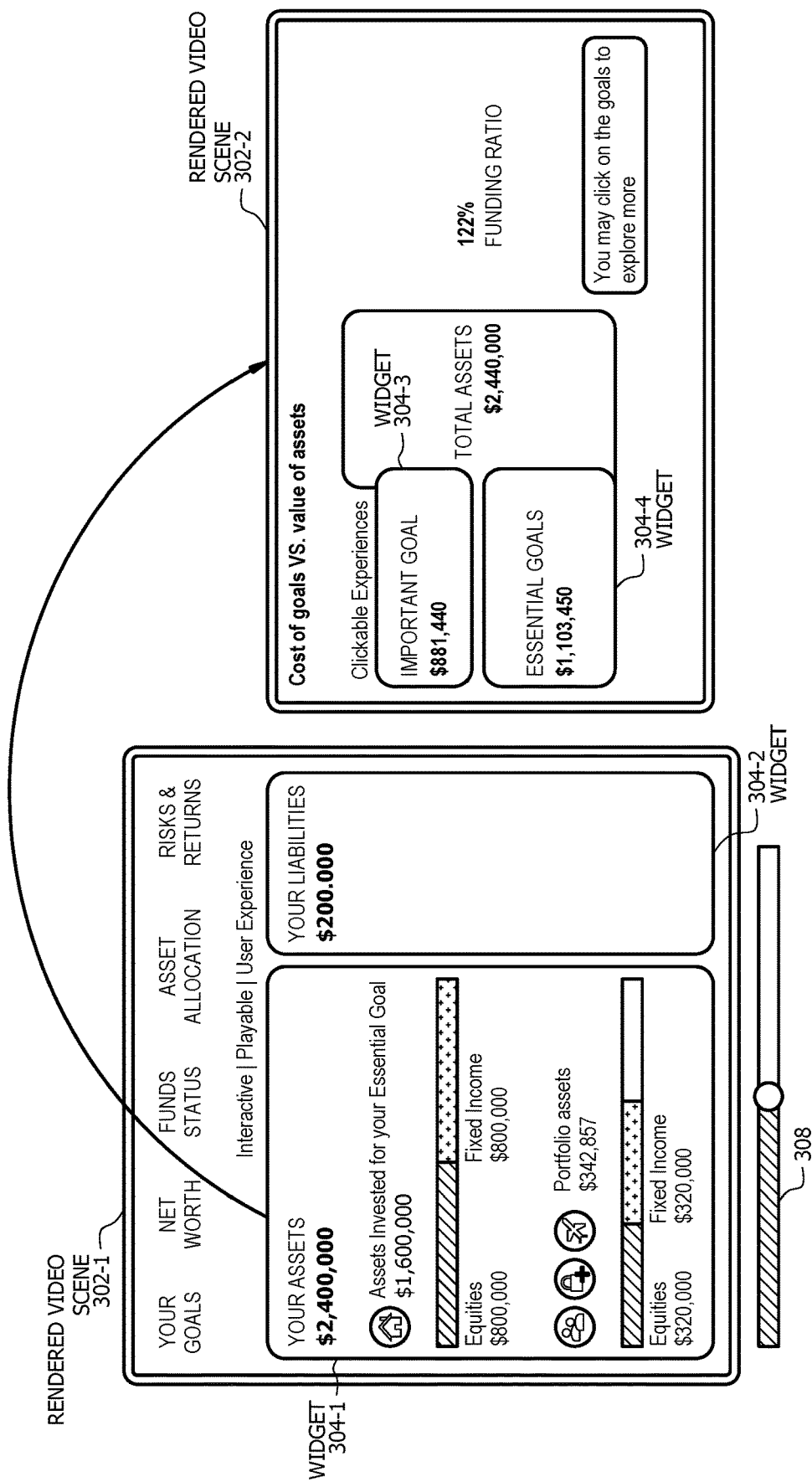
FIG. 3 is an embodiment of a rendered video scene of an interactive video.
Figure 4:
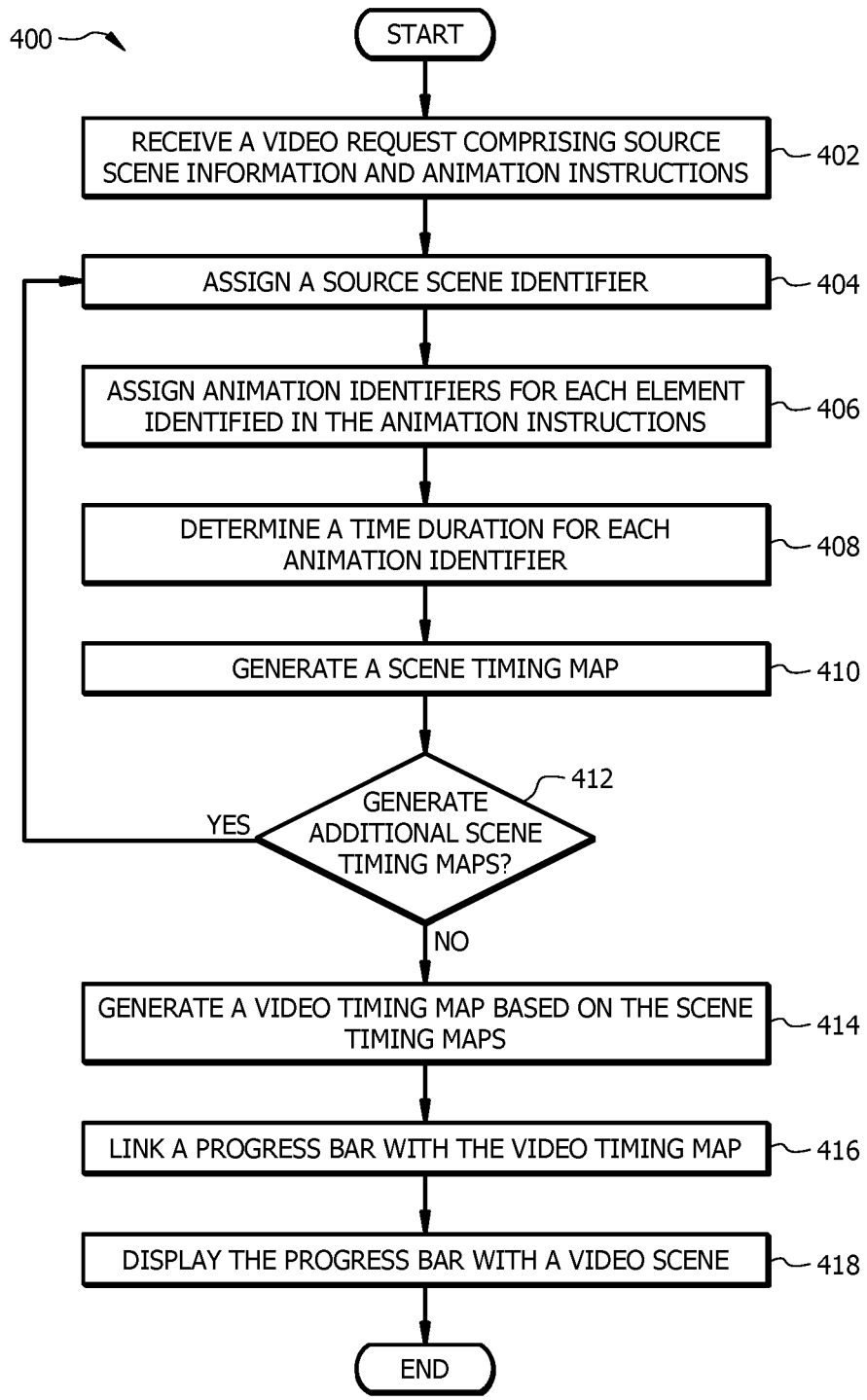
FIG. 4 is a flowchart of an embodiment of a progress bar generating method for an interactive video.
Figure 5:
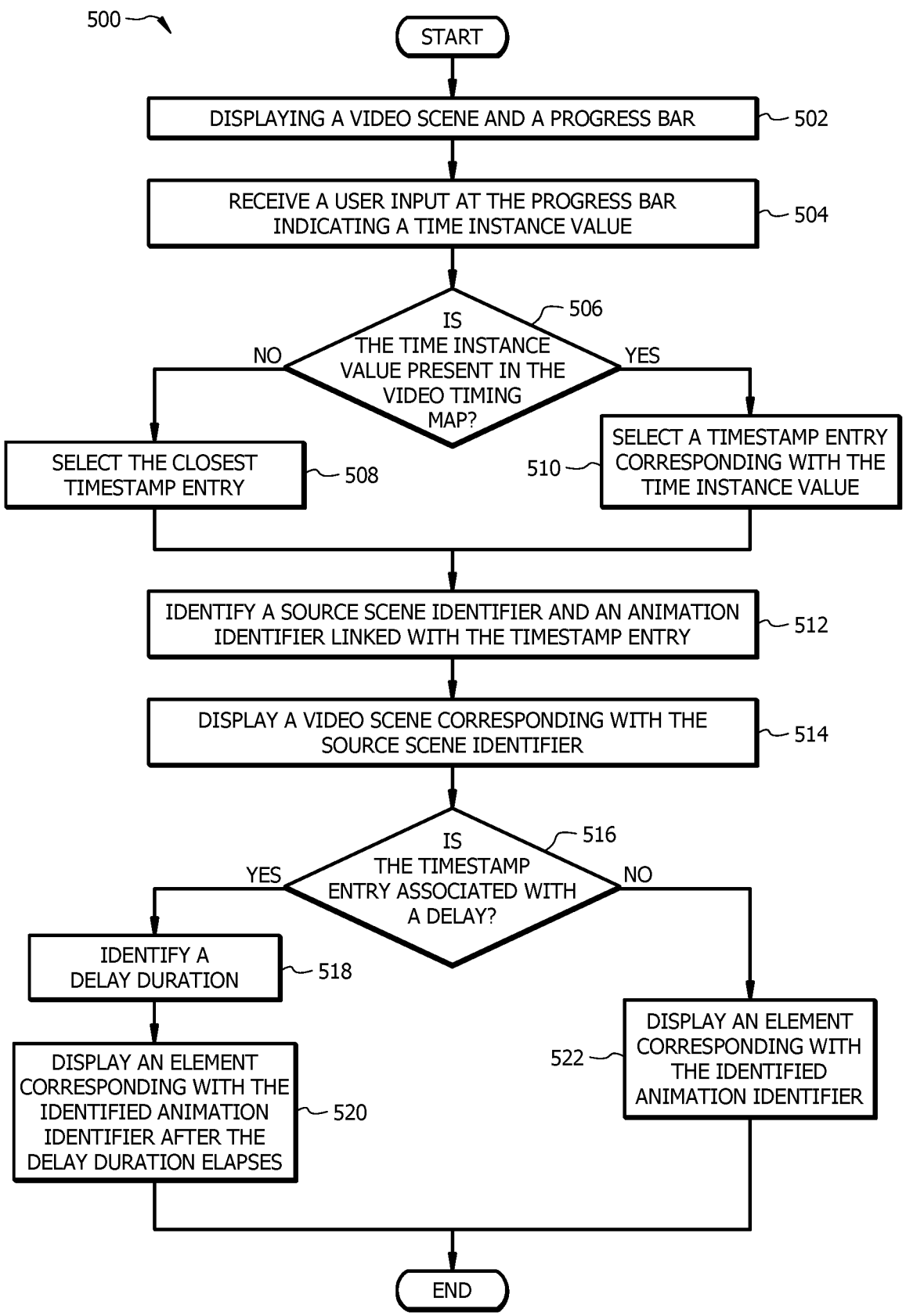
FIG. 5 is a flowchart of an embodiment of an interactive video synchronization method for an interactive video.

FIG. 1 is an example of an interactive video system configuration to generate interactive HTML videos. FIG. 2 is an example of a scene source for an interactive HTML video. FIG. 3 is an example of a rendering of a portion of an interactive HTML video. FIG. 4 is an example of a process for linking animations in an interactive HTML video with a progress bar. FIG. 5 is an example of a process for using a progress bar that is linked with animations in an interactive HTML video.

Figure 6:
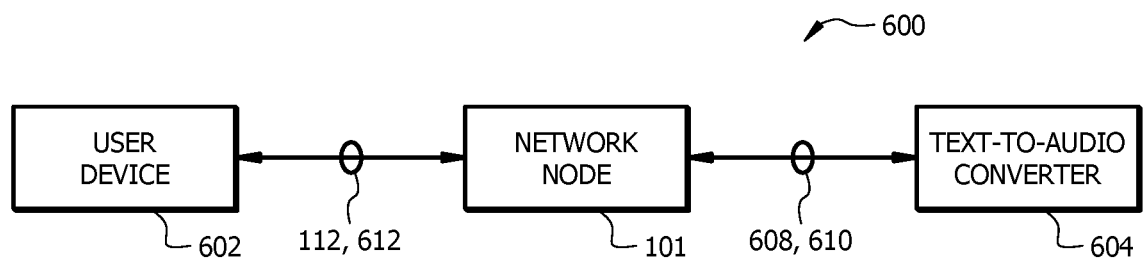
FIG. 6 is a schematic diagram of an embodiment of an architecture 600 for implementing text-to-audio for interactive videos.
Figure 7A:
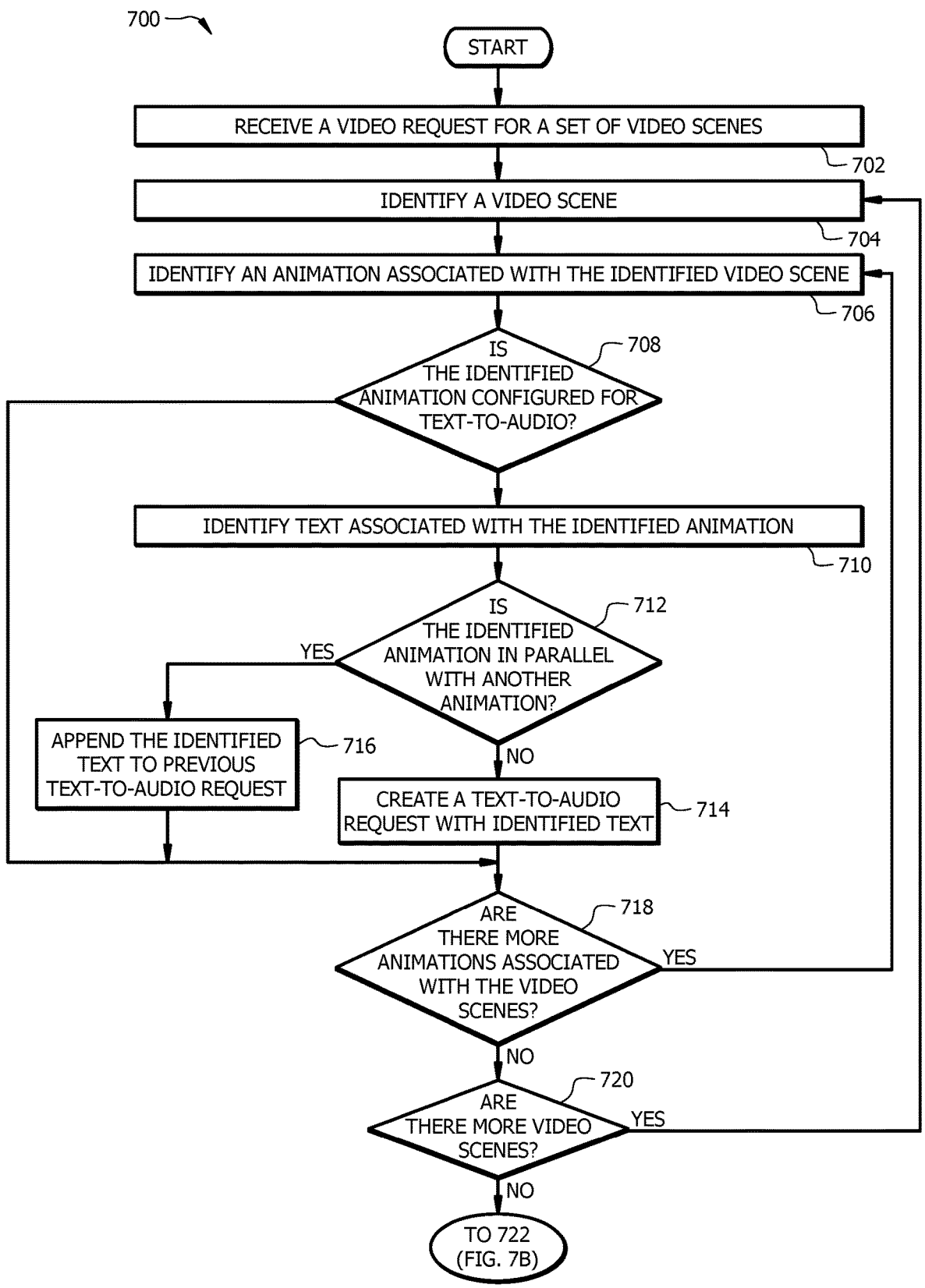
FIG. 7A is a first portion of a flowchart of an embodiment of an interactive video generation method with text to audio.
Figure 7B:
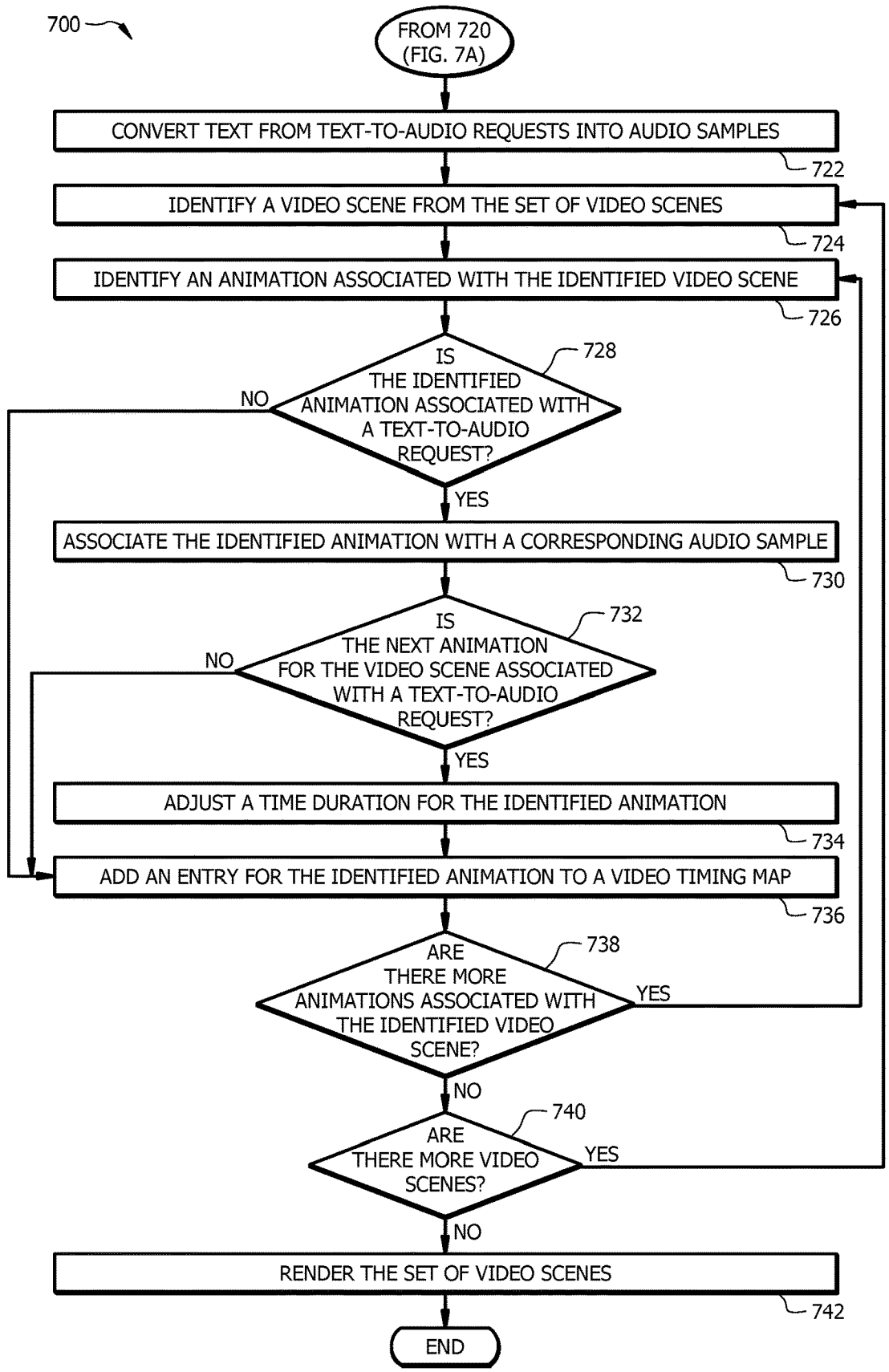
FIG. 7B is a second portion of a flowchart of an embodiment of an interactive video generation method with text to audio.
Figures 8, 9:
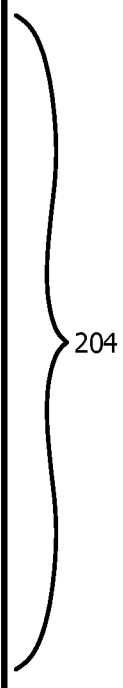
FIG. 8 is an example of a video request for an interactive video.
FIG. 9 is an example of a portion of a video request with animations configured for text-to-audio.
Figure 13:
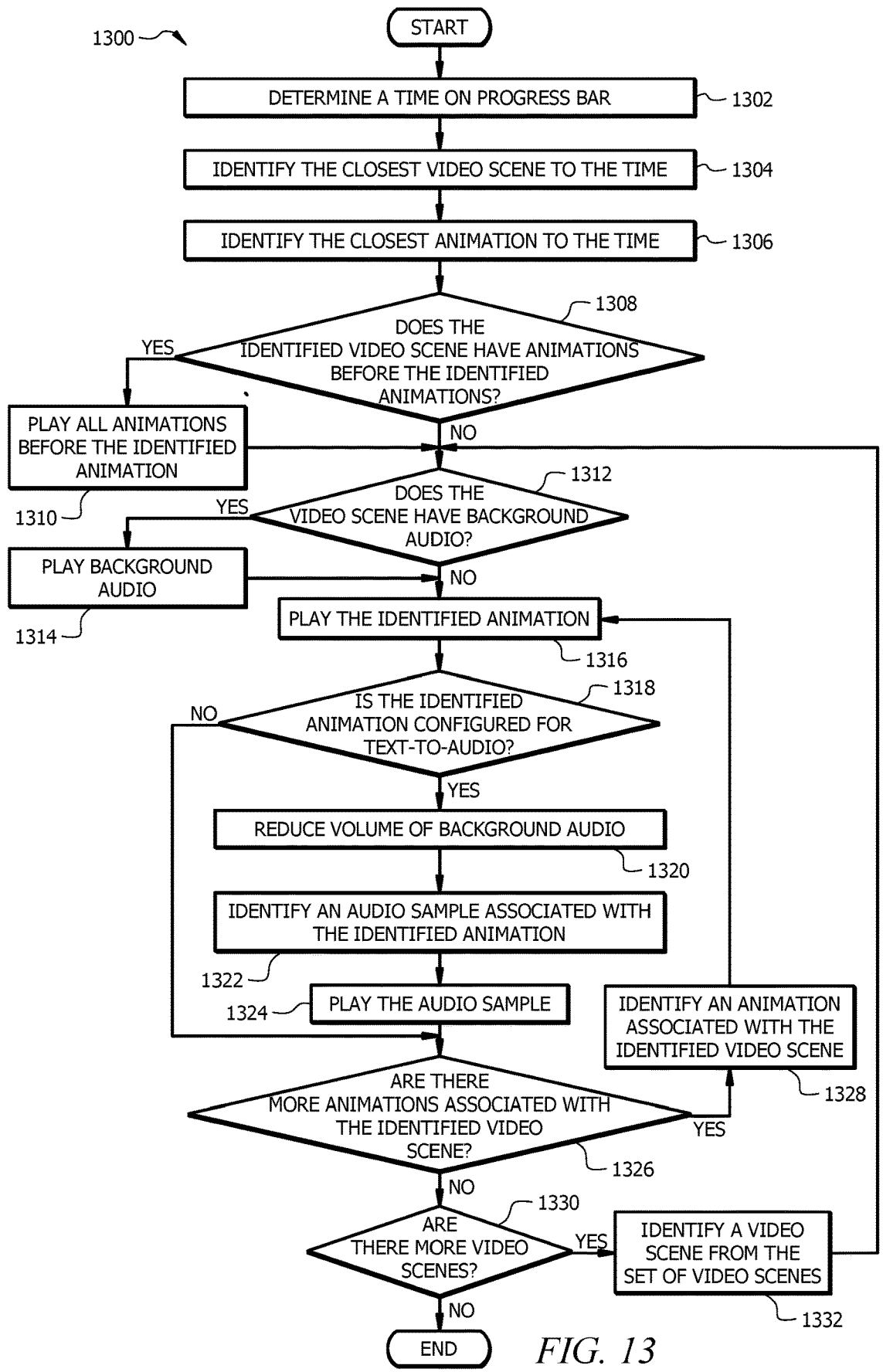
FIG. 13 is a flowchart of an embodiment of an interactive video playing method with text to audio.
Figure 14:
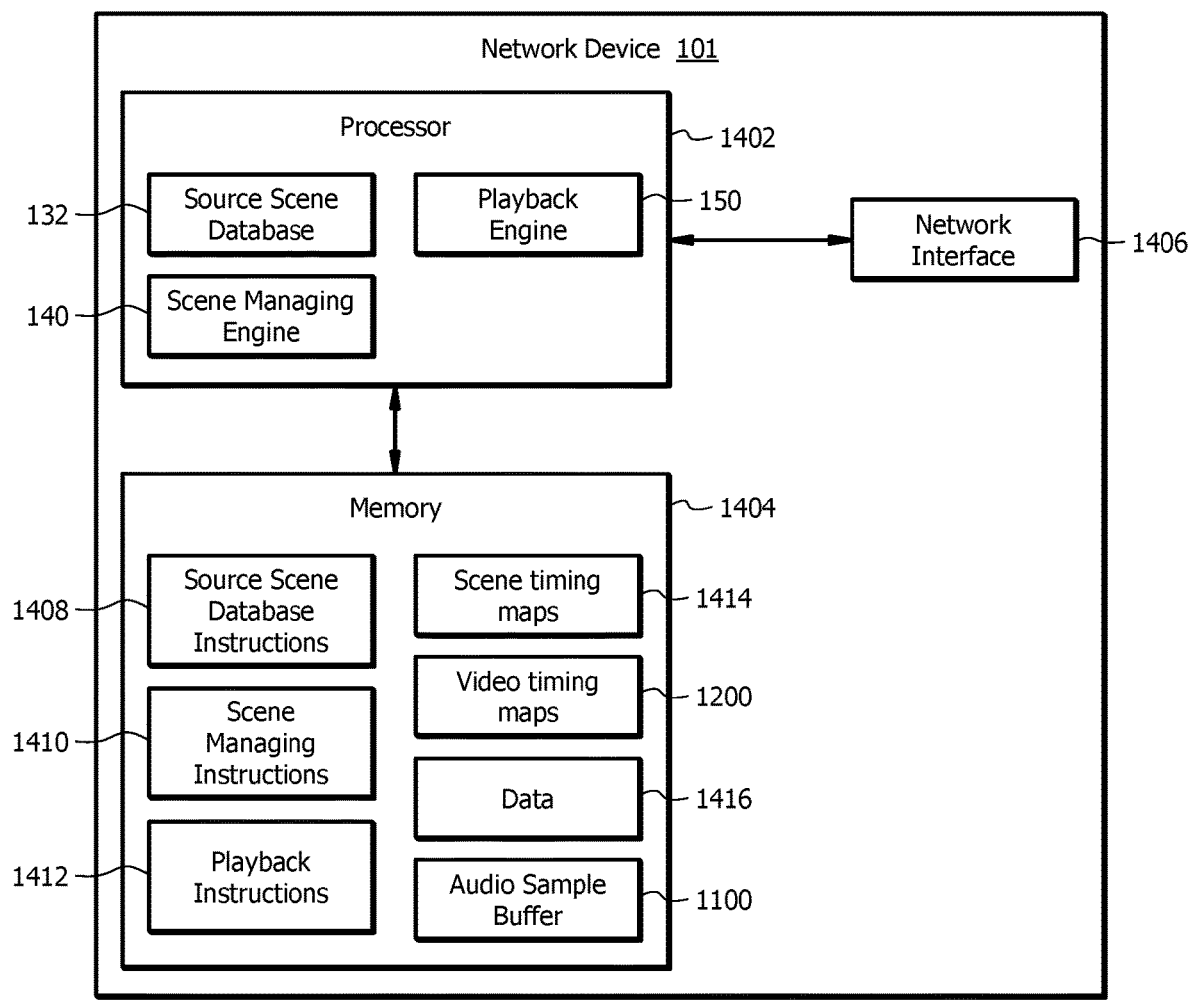
FIG. 14 is a schematic diagram of an embodiment of network device configured to create an interactive video using a markup language.

FIG. 6 is a schematic diagram for an architecture for implementing text-to-audio for an interactive HMTL video. FIGS. 7A and 7B combine as an example of a process for generating an interactive HTML video with text-to-audio. FIGS. 8-10 are examples of portions of a video request for an interactive HTML video configured with text-to-audio. FIG. 11 is an example of an audio sample buffer for associating animations with audio sample. FIG. 12 is an example of a video timing map for an interactive HTML video that is configured for text-to-audio. FIG. 13 is an example of a process for playing an interactive HTML video with text to audio. FIG. 14 is an example of a network node configured to generate interactive HTML videos.

System Overview

FIG. 1 is a schematic diagram of an embodiment of an interactive video system for creating interactive videos using a markup language according to the present disclosure. The system 100 comprises one or more network devices 101 in signal communication with one or more users 110 via a network 120. For example, a user 110 may employ a computer or mobile device (e.g. a smart phone) to communicate with the network node 101 using a network connection. The system 100 is generally configured to receive a video request 112 from a user 110, to retrieve a set of source scenes 132 from a source scene database 130, to generate video scenes 160 in the form of Hypertext Markup Language (HTML) pages using a scene managing engine 140, to include the video scenes 160 in a scene collection 170, and to process the scene collection 170 using a playback engine 150.

The network 120 is any suitable type of network operable to support communication between users and components (e.g. network nodes 101) of the system 100. The network 120 is configured to enable wired and/or wireless communications. For example, the network 120 may include all or a portion of the Internet, a public switched telephone network (PSTN), a public network, a private network, a local area network (LAN), a metropolitan area network (MAN), a wide area network (WAN), or any other suitable type of network. The network 120 may be configured to support any suitable type of communication protocol as would be appreciated by one of ordinary skill in the art upon viewing this disclosure.

The network node 101 comprises a source scene database 130, a scene managing engine 140, and a playback engine 150. In FIG. 1, the source scene database 130, the scene managing engine 140, and the playback engine 150 are shown as being implemented in a single network device 101. In other examples, the source scene database 130, the scene managing engine 140, and the playback engine 150 may be implemented by any suitable number of network nodes 101. Additional information about the network node 101 is described in FIG. 9.

Source Scene Database

The source scene database 130 is configured to store and maintain source scene 132 information. The source scene database 130 may be implemented by one or more processors or data storage devices (e.g., disks, solid-state drives). In FIG. 1, the source scene database 130 is shown as located within the network device 101. In some embodiments, the source scene database 130 may be a data storage device that is external to the network device 101. For example, the source scene database 130 may be a data storage device that is in signal communication with the network node 101.

Source scenes 132 include source code for the web content requested by users 110. For example, source scenes 132 may include source code for generating relevant web content such as, for example, stock information, account balance information for users 110, and instructions on how to conduct a trade, among others. In some embodiments, each source scene 132 includes a source scene identifier (ID) 134 and a set of instructions 136 comprising HTML instructions and animation instructions related to the web content. For example, referring to FIG. 2, a source scene 132 includes source scene ID 134, HTML instructions 202, and animation instructions 204. In some embodiments, the instructions 136 in the source scenes 132 are written in a format of JavaScript Object Notation (JSON). In alternative embodiments, the instructions 136 in the source scenes 132 may be written in any other suitable language or format.

The HTML instructions 202 in the source scenes 132 are used to generate HTML code for the web content associated with the source scenes 132. For example, the HTML instructions may include instructions 136 identifying the number and/or types of HTML elements that will be included in the generated HTML code. An HTML element may have a format of HTML string, a Document Object Model (DOM) element, jQuery object, or any other suitable format. The animation instructions 204 in the source scenes 132 are used to generate animations for the web content associated with the source scenes 132. For example, the animation instructions 204 may include instructions 136 identifying the number and/or types of animations that will be generated. In some embodiments, a source scene 132 further includes other instructions. For example, referring to FIG. 2, a source scene 132 may further include audio instructions 206 and/or transition effect instructions 208.

Scene Managing Engine

The scene managing engine 140 is configured to manage source scenes 132. The scene managing engine 140 comprises tools and libraries to support processing the source scenes 132. For example, scene managing engine 140 may be configured to retrieve source scenes 132 from source scene database 130 and to generate a video scene 160 for each of the retrieved source scenes 132 as described in greater detail below.

The scene managing engine 140 is configured to retrieve source scenes 132 from the source scene database 130. For example, the scene managing engine 140 receives a video request 112 from a user 110 which may include a set of source scene IDs 134 arranged in a pre-determined ordering specified by the user 110. For instance, the user 110 may want to generate a video for trading (e.g. sell or buy) a particular stock using the system 100. In this example, the user 110 may want to view past performance of the stock, check whether the user 110 has enough account balance to trade the stock, and watch a video on how to conduct a trade on the stock. The system 100 may provide the user 110 with the capabilities to select sources scenes 132 related to such information. For example, the user 110 may specify, in the video request 112, a first source scene ID 134 associated with a first source scene 132 about statistics of stocks, a second source scene ID 134 associated with a second source scene 132 about account balances of the user 110, and a third source scene ID 134 associated with a third source scene 132 about instructions on conducting a trade. The three source scene IDs 134 in the video request 112 may be arranged in a pre-determined ordering, such as in the order of the first source scene ID 134, the second source scene ID 134, and the third source scene ID 134. The scene managing engine 140 is configured to read the source scene IDs 134 in the video request 112 and to retrieve source scenes 132 associated with the source scene IDs 134 from the source scene database 130. The scene managing engine 140 identifies the source scenes 132 based on the source scene IDs 134 and retrieves the identified source scenes 132.

The scene managing engine 140 is further configured to generate video scenes 160 from the source scenes 132. The scene managing engine 140 generates a video scene 160 in the form of a web page written in a markup language. For example, the scene managing engine 140 may generate a video scene 160 in the form of an HTML page. In some embodiments, video scene 160 includes one or more interactive HTML elements 162, one or more animations 164, one or more audios 166, and one or more transition effects 168. The one or more interactive HTML elements 162 may have a format of a HTML string, a DOM element, a jQuery object, or any other suitable format. The animations 164 may have a format of JavaScript or any other suitable format. In some embodiments, the scene managing engine 140 generates the video scenes 160 from the source scenes 132 based on the instructions 136 in the sources scenes 132. For example, generation module 146 may use the HTML instructions 202 in the source scenes 136 to generate HTML code including the interactive HTML elements 162 and use the animation instructions 204 in the source scenes 136 to generate one or more animations 164 associated with the HTML code. In some embodiments, the animations 164 written in JavaScript are embedded in the HTML code generated from the HTML instructions 202. The scene managing engine 140 may be further configured to use the audio instructions 206 and transition effect instructions to generate audios 166 and transition effect 168 and insert them in the HTML code.

In some embodiments, one or more interactive HTML elements 162 are implemented as one or more widgets that allow users 110 to interactively view information in the video scenes 160. For example, a first video scene 160 may include a first HTML element 162 implemented as a first widget, which provides a drill-down capability such as a dropdown menu showing a list of stocks. Each stock in the dropdown menu, when clicked by the user 110, may show statistics such as historical performance of the stock. As another example, a second video scene 160 may include a second HTML element 162 implemented as a second widget, which provides a drilldown capability such as a dropdown menu showing a list of accounts owned by the user 110, such as a retirement account, a checking account, and an investment account, among others. Each account in the dropdown menu, when clicked by the user 110, may show account balance of the account. As another example, a third video scene 160 may include a third HTML element 162 implemented as a third widget, which provides a drilldown capability such as a dropdown menu showing a list of videos on instructions on conducting a trade on, stocks, equities, bonds, and mutual funds, among others. In this example, each video in the dropdown menu, when clicked by the user 110, may play a video on instructions on conducting a particular trade.

The video scenes 160 include interactive HTML elements 162 that allow users to interact with the video scenes 160. Allowing users 110 to interact with video scenes 160 increases the efficiency of the system 100 because the users 110 do not need to be redirected to different places (e.g., web pages) and bounce around to find and use the information they want. Instead, users 110 can stay on and interact with the video scenes 160 to find the information they want. By doing this, users 110 can avoid being redirected to multiple places and the system 100 can avoid reloading or rebuffering the same web pages or content. This reduces the response time of the system 100 and conserves computing resources, memories, and other network resources.

After generating video scenes 160 for all the source scenes 132, the scene managing engine 140 comprises the video scenes 160 into a scene collection 170. The video scenes 160 in the scene collection 170 are arranged in an ordering corresponding to the pre-determined ordering of the source scene IDs 134 specified in the video request 112. The scene managing engine 140 forwards the generated scene collection 170 to playback engine 150 for subsequent processing.

Playback Engine

Playback engine 150 is configured to process video scenes 160 in a scene collection 170. Playback engine 150 comprises tools and libraries to support creating an interactive video based on the video scenes 160 in the scene collection 170. The playback engine 150 is generally configured to receive a scene collection 170, to process the video scenes 160 in the scene collection 170, and to create an interactive video based on the video scenes 160.

In one embodiment, the playback engine 150 is configured to receive the scene collection 170 from the scene managing engine 140 and to process the video scenes 160 in the scene collection 170. For example, the playback engine 150 may map the video scenes 160 to a timeline. Specifically, the playback engine 150 may assign an animation ID to each of the animations 164 associated with each of the video scenes 160. In some embodiments, each animation 164 may include one or more frames. The playback engine 150 may further assign an animation ID to each of the frames in each of the animations 164. Then, the playback engine 150 maps the animation IDs to a pre-determined timeline. For example, the playback engine 150 may associate each animation ID with a time stamp in the pre-determined timeline. In some embodiments, the pre-determined timeline is determined based on the pre-determined ordering of source scene IDs in the video request 112.

The playback engine 150 is further configured to render the video scenes 160 in the received scene collection 170. The playback engine 150 comprises tools and libraries to support parsing a markup language (e.g., HTML), analyzing elements in the markup language, and creating a formalized layout of the elements. For example, the playback engine 150 may be configured to parse the video scenes 160 in the form of an HTML page, to analyze the interactive HTML elements 162 in the HTML page, and to create a layout of the HTML page including some widgets implemented by the interactive HTML elements 162. For example, referring to FIG. 3, a first video scene 160 is rendered as a first rendered video scene 302-1 configured with two widgets 304, namely a first widget 304-1 and a second widget 304-2. The first widget 304-1 may be implementing a first interactive HTML element 162 of the first video scene 160, and the second widget 304-2 may be implementing a second interactive HTML element 162 of the video scene 160. As illustrated, the first widget 304-1 is configured to show assets of user 110 and the second widget 304-2 is configured to show liabilities of the user 110. When viewing a video including the rendered video scene 302-1, a user 110 can pause the interactive video at the video scene 302-1 and interact with any one of the two widgets 304. For example, the user 110 may click on an HTML link or an interactive HTML element in the widgets 304. The HTML link or the interactive HTML element in the widgets 304, when clicked or pressed, may present one or more web content items or performs one or more predetermined drill-down tasks. The two widgets 304 of rendered video scene 302-1 provide users 110 with drill-down capabilities to view additional information. For example, when the user 110 clicks on the first widget 304-1 showing assets of the user 110, the system 100 may display another rendered video scene 302-2 including another two widgets 304-3 and 304-4 that shows "important goal" and "essential goal" for the user 110, respectively. The two widgets 304-3 and 304-4 may further have drill-down capabilities that allow user 110 to click on the widgets 304 and explore additional information.

The playback engine 150 may be further configured to render the animations 164 associated with a video scene 160. The rendering engine 152 creates an interactive video by including the animations 164 in the rendered video scenes 160. The playback engine 150 is configured to play back the video generated based on the rendered scene collection 170. Playback engine 150 may be configured to map the timeline of the frames and/or the animations 164 to a progress bar 308 and to play the video for the user 110. An example of mapping animations 164 to a progress bar 308 is described in FIG. 4. An example of using the disclosed progress bar 308 is described in FIG. 5. The playback engine 150 plays the video in the form of a series of HTML pages while allowing users 110 to pause and interact with the interactive HTML elements 162 implemented as widgets 304 in the video. In this way, the system 100 provide users 110 with an interactive video experience with drilldown capabilities, which supports customization and personalization for individual users 110.

Video Generating Process

The following is a non-limiting example of the system 100 in operation. The system 100 receives a video request 112 from a user 110. Specifically, the scene managing engine 140 receives the video request 112 that comprises a set of source scene IDs 134. The source scene IDs 134 in the video request 112 are arranged in a pre-determined order specified by the user 110. Then, the scene managing engine 140 uses the source scene IDs 134 to retrieve the source scenes 132 corresponding to the source scene IDs 134 from the source scene database 130. Next, the scene managing engine 140 receives the source scenes 132 and generates a video scene 160 for each of the received source scenes 132. For example, the scene managing engine 140 may generate a video scene 160 in the form of an HTML page for each source scene 132. In some embodiments, the scene managing engine 140 generates the video scenes 160 from the source scenes 132 based on the instructions 136 in the source scenes 132. For example, the scene managing engine 140 may use the HTML instructions 202 in the source scenes 136 to generate HTML code including one or more interactive HTML elements 162 and use the animation instructions 204 in the source scenes 136 to generate one or more animations 164 associated with the HTML code.

After generating video scenes 160 for each of the source scenes 132, the scene managing engine 140 includes the video scenes 160 in a scene collection 170. The video scenes 160 in the scene collection 170 are arranged in an ordering corresponding to the pre-determined ordering of the source scene IDs 134 specified in the video request 112. The scene managing engine 140 forwards the generated scene collection 170 to playback engine 150 for subsequent processing.

The playback engine 150 receives the scene collection 170 from the scene managing engine 140 and processes the video scenes 160 in the scene collection 170. For example, the playback engine 150 may map the video scenes 160 to a timeline. Specifically, the playback engine 150 may assign an animation ID to each of the animations 164 associated with each of the video scenes 160. In some embodiments, each animation 164 may include one or more frames. The playback engine 150 may further assign an animation ID to each of the frames in each of the animations 164. Then, the playback engine 150 maps the animation IDs to a pre-determined timeline. For example, the playback engine 150 may associated each animation ID with a time stamp in the pre-determined timeline. In some embodiments, the pre-determined timeline is determined based on the pre-determined ordering of source scene IDs in the video request 112.

Next, the playback engine 150 parses the video scenes 160 in the form of an HTML page, analyzes the interactive HTML elements 302 in the HTML page, and creates a layout of the HTML page including some widgets implemented by the interactive HTML elements 302. The playback engine 150 renders the animations 164 associated with the video scenes 160. In some embodiments, the playback engine 150 creates an interactive video by including the animations 164 in the rendered video scenes 302.

The playback engine 150 maps the timeline of the frames and/or the animations 164 of the rendered videos scenes 302 to a progress bar 308 and plays the video for the user 110. An example of a process for mapping video scenes 160 to a progress bar 308 is described in FIG. 4. The playback engine 150 may play the video while allowing users 110 to pause and interact with the interactive HTML elements 302 in each video scene 160 in the interactive video. In some embodiments, the interactive HTML elements 302 are implemented as widgets 304 that allow users 110 to interactively view information in the video scenes 160.

Progress Bar Generating Process

FIG. 4 is a flowchart of an embodiment of a progress bar generating method 400 for an interactive video. Unlike traditional videos where a progress bar has a one-to-one correspondence between time and video frames, an interactive HTML videos may comprise animations 164, delays, and interactive HTML elements that have different timing characteristics. These elements have variable timing characteristics because these elements may occur sequentially, in parallel, or may even be optional. These variable timing characteristics mean that interactive HTML videos do not follow a linear timeline or have one-to-one correspondence between time and video scenes. The playback engine 150 may employ method 400 to generate progress bar 308 for an interactive HTML video. The progress bar 308 provides a user interface that links video scenes 160 and other elements in an interactive HTML video.

At step 402, the playback engine 150 receives a video request 112 comprising source scene information for a set of video scenes 160 (e.g. a scene collection 170) and animation instructions 204. An example of a video request 112 is shown below in Table 1. The animation instructions 204 comprise a set of elements (e.g. animations 164, delays, and interactive HTML elements) and time durations linked with each element in the set of the elements. Referring to Table 1 as an example, the video request 112 comprises information for two video scenes 160. The first scene comprises three elements (shown as "elem1," "elem2," and "elem3"). The first element is linked with a time duration of 1000 milliseconds (ms). The time duration indicates how long the element takes to finish execution. The second element is linked with a time duration of 2000 ms and a delay of 1000 ms. The delay indicates the length of time for a waiting period before executing an element. The third element is linked with a time duration of 3000 ms. In this example, the time durations and delays are in units of milliseconds. In other examples, the time durations and delays may be in any other suitable units. Similarly, the second video scene 160 comprises three elements (shown as "elem4," "elem5," and "elem6"). The animation instructions 204 may further comprise properties or any other suitable type of information related to the elements. In some embodiments, the animation instructions 204 may comprise audio instructions 206 and/or transition effect instructions 208.

TABLE 1

Example of a video request

```
{
    "metadata": {
        "html": "html",
        "animations": [
            { "e": ".elem1", "p": { "left": "10%"}, "o": {"duration": 1000}},
            { "e": ".elem2", "p": { "scale": 2 }, "o": {"duration": 2000, "delay" : 1000}},
            { "e": ".elem3", "p": { "left": "0%"}, "o": {"duration": 3000}},
        ]
    }
},
{
    "metadata": {
        "html": "html",
        "animations": [
```

TABLE 1-continued

Example of a video request

```
            { "e": ".elem4", "p": { "left": "10%"}, "o": {"duration": 1000}},
            { "e": ".elem5", "p": { "scale": 2 }, "o": {"duration": 2000}},
            { "e": ".elem6", "p": { "left": "0%"}, "o": {duration": 3000, "delay" : 500}},
        ]
    }
}
```

At step 404, the playback engine 150 assign or determines a source scene ID 134 for a video scene 160. Here, the playback engine 150 assigns source scene IDs 134 that uniquely identify each video scene 160 in the set of video scenes 160. For example, the playback engine 150 may associate the first video scene 160 with a source scene ID 134 of "sId1" and the second video scene 160 with a source scene ID 134 of "sId2." In other examples, the playback engine 150 may use any suitable type of identifier for identifying the video scenes 160 in the set of video scenes 160.

At step 406, the playback engine 150 assigns animation IDs for each element identified in the animation instructions. Here, the playback engine 150 assigns animation IDs that identify one or more elements. Referring to Table 1, the playback engine 150 may assign the first element "elem1" with animation ID of one. The playback engine 150 may also assign animation IDs to delays that are associated with an element. For example, the playback engine 150 may assign an animation ID to the delay that is linked with the second element "elem2." In other examples, the playback engine 150 may use any suitable type of identifier for identifying the elements. An example of using animation IDs is shown below in Table 2.

At step 408, the playback engine 150 determines a time duration for each animation ID. Referring to Table 1, the playback engine 150 may use the time durations linked with an element as the time duration for the corresponding animation ID. For example, the playback engine 150 may determine that the time duration for the animation ID linked with first element "elem1" is 1000 ms, the time duration for the animation ID linked with the second element "elem2" is 2000 ms, the time duration for the animation ID linked with the delay for the second element is 1000 ms, and so on.

In some embodiment, the animation instructions 204 may indicate that one or more of elements are configured to run in parallel. For example, the animation instructions 204 may comprise a flag that indicates when elements are configured to run in parallel. In this example, the playback engine 150 may determine which element has the largest time duration and may use this time duration as the time duration for the animation ID linked with the elements running in parallel. For instance, the playback engine 150 may determine that a first element and a second element are configured to run in parallel in response to identifying a flag in the animation instructions 204. The first element is linked with a time delay of 1000 ms and the second element is linked with a time duration of 2000 ms. In this example, the playback engine 150 will use the time duration of 2000 ms for the animation ID linked with the first element and the second element running in parallel. This process takes into account that the first element and the second element are running in parallel and not sequentially.

At step 410, the playback engine 150 generates a scene timing map. An example of a scene timing map is shown below in Table 2. The scene timing map is configured to link source scene IDs 134 with animation ID and their corresponding time durations. Referring to Table 2 as an example, the playback engine 150 links the source scene ID 134 for the first video scene 160 with the animation IDs for the first element, the second element, the third element, and their delays. In this example, an animation ID with a value of one is linked with the first element "elem1." An animation ID with a value of two is linked with a first portion of the delay associated with the second element "elem2" and an animation ID with a value of three is linked with a second portion of the delay associated with the second element "elem2." An animation ID with a value of four is linked with the second element "elem2." An animation ID with a value of five is linked with the third element "elem3." Each animation ID is linked with its corresponding time duration that was determined in step 408. The process of linking source scene IDs 134 with animation IDs and their corresponding time durations is repeated for every video scene 160. The scene timing map may further comprise a start time value associated with each video scene 160 or any other information.

TABLE 2

Example of a scene timing map

```
{
    "sld": 1,
    "startTime": 0,
    "animations": [
            { "aId": 1, "e": ".elem1", "p": { "left": "10%"}, "o": {"duration": 1000}},
            { "aId": 2, "da": 1, "o ": {"duration": 500}},
            { "aId": 3, "da": 1, "o ": {"duration": 500}},
            { "aId": "e": ".elem2", "p": { "scale": 2 }, "o": {"duration": 2000, "delay" : 1000}},
            { "aId": 5, "e": ".elem3", "p": { "left": "0%"}, "o": {"duration": 3000}},
        ]
    }
},
{
    "sld": 2,
    "startTime": 7000,
```

TABLE 2-continued

Example of a scene timing map

```
"animations": [
        { "aId": 6, "e": ".elem4", "p": { "left": "10%"}, "o": {"duration": 1000}},
        { "aId": 7, "e": ".elem5", "p": { "scale": 2 }, "o": {"duration": 2000}},
        { "aId": 8, "da": 1, "o ": {"duration": 500}},
        { "aId": 9, "e": ".elem6", "p": { "left": "0%"}, "o": {duration: 3000, "delay" : 500}},
        ]
    }
}
```

At step 412, the playback engine 150 determines whether to generate additional scene timing maps. For example, the playback engine 150 may determine whether there any more video scenes 160 in the video request 112 that need to be processed and added to the scene timing map. The playback engine 150 returns to step 404 in response to determining to generate another scene timing map. The playback engine 150 proceeds to step 414 in response to determining not to generate additional scene timing maps.

At step 414, the playback engine 150 generates a video timing map based on the scene timing maps. An example of a video timing map is shown below in Table 3. The video timing map comprises a set of timestamp entries that each reference a source scene ID 134 and an animation ID in the scene timing map. Referring to Table 3 as an example, the video timing map comprises timestamp entries with values of 0, 2, 3, 4, 8, 14, 16, 20, and 21. In this example, the value of the timestamp entry corresponds with a multiplier value for time units of 500 ms. For instance, a timestamp entry value of two corresponds with 1000 ms or 1 second. A timestamp entry value of four corresponds with 2000 ms or 2 seconds. In other examples, the timestamp entry value may represent an instance in time. In some embodiments, the timestamp entry value may be a unit of time. Each timestamp entry is linked with a source scene ID 134 and an animation ID. For example, the first timestamp entry (shown as "t": 0) references the first source scene ID 134 (shown as "sId": 1) and the first animation ID (shown as "aId": 1), the second timestamp entry (shown as "t": 1) references the second source scene ID 134 (shown as "sId": 2) and the second animation ID (shown as "aId": 2), and so on. The video timing map may further comprise a total time for executing or presenting the interactive video or any other information associated with the interactive video.

TABLE 3

Example of a video timing map

```
{
    "map": [
            { "t": 0, "d": { "sId": 1, "aId": 1}},
            { "t": 2, "d": { "sId": 1, "aId": 2}},
            { "t": 3, "d": { "sId": 1, "aId": 3}},
            { "t": 4, "d": { "sId": 1, "aId": 4}},
            { "t": 8, "d": { "sId": 1, "aId": 5}},
            { "t": 14, "d": { "sId": 2, "aId": 6}},
            { "t": 16, "d": { "sId": 2, "aId": 7}},
            { "t": 20, "d": { "sId": 2, "aId": 8}},
            { "t": 21, "d": { "sId": 2, "aId": 9}},
        },
        "totalTime": 14300
}
```

At step 416, the playback engine 150 links a progress bar 308 with the video timing map. The progress bar 308 is a user interface that allows the user to select time instances within the interactive video. In one embodiment, the progress bar 308 is a slider bar. In other embodiments, the progress bar 308 may be represented using any other suitable representation as would be appreciated by one of ordinary skill.

At step 418, the playback engine 150 displays the progress bar 308 with a video scene 160 from the interactive video. An example of displaying a progress bar 308 with a video scene 160 is shown in FIG. 3. An example of a using the progress bar 308 to display a particular portion of the interactive video is described in FIG. 5.

In one embodiment, the interactive HTML video may comprise one or more interactive HTML elements that are embedded in a video scene. A video scene 160 may have a button, a slider, shortcut, or any other suitable type of interactive HTML element embedded in a video scene 160. For example, a video scene 160 may comprise a button that triggers the playback engine 150 to provide web content when the button is pressed by a user 110. In other examples, interactive HTML elements may be configured to trigger any other actions to be performed by the playback engine 150. In one embodiment, the playback engine 150 is configured to pause the progression of the progress bar 308 when the interactive HTML element is activated (e.g. pressed or manipulated) by a user 110. For example, the playback engine 150 may suspend the progression of a progress bar 308 when a user 110 presses an interactive HTML element to access web content and may resume the progression of the progress bar 308 when the user 110 returns the original video scene.

Progress Bar Operation Process

FIG. 5 is a flowchart of an embodiment of an interactive video synchronization method 500 for an interactive video. As discussed above, interactive HTML videos do not follow a linear timeline or have one-to-one correspondence between time and video scenes because of their variable timing characteristics. The playback engine 150 may employ method 500 to synchronize video scenes in an interactive HTML video.

At step 502, the playback engine 150 displays a video scene 160 from an interactive video and a progress bar 308. For example, the playback engine 150 may generate an interactive HTML video and a progress bar 308 using the techniques previously described. For instance, the playback engine 150 may use a process similar to the process described in FIG. 5 for generating an interactive HTML video and progress bar 308.

At step 504, the playback engine 150 receive a user input at the progress bar 308 that indicates a time instance value. For example, the progress bar 308 may be represented as a slide bar and a user 110 may use a cursor on the slide bar to indicate a time instance value. In other examples, a user 110 may use any other suitable technique for indicating a time instance value.

At step 506, the playback engine 150 determines whether the time instance value is present in the video timing map. The playback engine 150 compares the indicated time instance value to the timestamp entries in the video timing map to determine whether the time instance value matches any of the timestamp entries. The playback engine 150 proceeds to step 508 in response to determining that the time instance value is not present in the video timing map. The playback engine 150 proceeds to step 510 in response to determining that the time instance value is present in the video timing map.

At step 508, the playback engine 150 selects the closest timestamp entry in the video timing map. Here, the playback engine 150 selects the timestamp entry that closest matches the indicated time instance value. In one embodiment, the playback engine 150 selects a timestamp entry that immediately precedes the indicated time instance value when the time instance value is not present in the video timing map. Referring to Table 3 as an example, the playback engine 150 may receive a time instance value of ten and may select the timestamp entry with a value of eight as the closest timestamp entry.

Returning to step 506, the playback engine 150 proceeds to step 510 in response to determining that the time instance value is present in the video timing map. At step 510, the playback engine 150 selects a timestamp entry corresponding with the time instance value.

At step 512, the playback engine 150 identifies a source scene ID 134 and an animation ID linked with the selected time stamp entry. Referring to Table 3 as an example, the playback engine 150 may select a timestamp entry with a value of eight and may identify the source scene ID 134 (shown as "sId": 1) and the animation ID (shown as "aId": 5) linked with the selected timestamp entry. The source scene ID 134 and the animation ID are used to reference entries and information in a scene timing map. Continuing with the previous example, the playback engine 150 may use the identified source scene ID 134 and the animation ID to determine which video scene 160 and element to display. In addition, the playback engine 150 may use the identified source scene ID 134 and the animation ID to identify other information related to the video scene 160 and element such as a properties and time durations. At step 514, the playback engine 150 displays a video scene 160 from the interactive HTML video that corresponds with the source scene ID 134.

At step 516, the playback engine 150 determines whether the timestamp entry is associated with a delay. The playback engine 150 may use the identified source scene ID 134 and the animation ID with the scene timing map to determine whether the timestamp entry corresponds with a delay. Referring to Table 3 as an example, the timestamp entry linked with the first source scene ID 134 (shown as "sId": 1) and the second animation ID (shown as "aId": 2) is associated with a delay having a time duration of 500 ms. As another example, the timestamp entry linked with the first source scene ID 134 (shown as "sId": 1) and the fourth animation ID (shown as "aId": 4) is not associated with a delay. The playback engine 150 proceeds to step 518 in response to determining that the timestamp entry is associated with a delay. The playback engine 150 proceeds to step 522 in response to determining that the timestamp entry is not associated with a delay.

At step 518, the playback engine 150 identifies a delay duration. The delay duration is equal to the time duration that is linked with the delay in the scene timing map. Referring to Table 3 as an example, the delay duration associated with the first source scene ID 134 (shown as "sId": 1) and the second animation ID (shown as "aId": 2) is 500 ms.

At step 520, the playback engine 150 displays an element corresponding with the identified animation ID after the delay duration elapses. For example, the playback engine 150 may first display the video scene 160 identified by the source scene ID 134 and then wait for an amount of time equal to the delay duration to elapse before displaying the element corresponding with the animation ID.

Returning to step 516, the playback engine 150 proceeds to step 522 in response to determining that the timestamp entry is not associated with a delay. At step 522, the playback engine 150 displays an element corresponding with the identified animation ID. In this example, the playback engine 150 may display the element without waiting a predetermined amount of time after displaying the video scene 160 corresponding with the source scene ID 134.

Text-to-Audio Architecture

FIG. 6 is a schematic diagram of an embodiment of an architecture 600 for implementing text-to-audio for interactive videos 612. In one embodiment, the architecture 600 comprises a user device 602, the network node 101, and a text-to-converter 604. The architecture 600 may be configured as shown or in any other suitable configuration.

Examples of user devices 602 include, but are not limited to, mobile devices (e.g. smart phones or tablets), computers, laptops, or any other suitable type of device. The user device 602 is configured to send video requests 112 for an interactive video 612 to the network node 101. The user device 602 is further configured to present interactive videos 612 to a user. For example, the user device 602 may be configured to present an interactive video 612 to a user using an application or web browser installed on the user device 602.

The network node 101 is configured to generate an interactive video 612 (e.g. an interactive HTML video) based on the video request 112 and to output the generated interactive video 612 to the user device 602. For example, the user device 602 may send the video request 112 to the network node 101 using a web browser. The network node 101 may be configured to output the generated interactive video 612 in the form of a series of HTML pages. In other examples, the network node 101 may be configured to output the interactive video 612 in any other suitable format. The network node 101 is further configured to provide text-to-audio capabilities for interactive videos 612 by employing a text-to-audio converter 604. By providing text-to-audio capabilities, the network node 101 is able to present information using a combination of text and audio. An example of the network node 101 performing this operation is described below in FIGS. 7A, 7B, and 13.

The text-to-audio converter 604 is configured to convert text into audio samples 610. In one embodiment, the text-to-audio converter 604 may be external to the network node 101. For example, the text-to-audio converter 604 may be implemented by a third-party device (e.g. a server). In this example, the network node 101 may be configured to send text-to-audio requests 608 that comprise text to the text-to-audio converter 604. The text-to-audio converter 604 is configured to convert the text from the text-to-audio request 608 into an audio sample 610 and to send the audio sample 610 back to the network node 101. In another embodiment, the text-to-audio converter 604 may be integrated with the network node 101. For example, the text-to-audio converter 604 may be an application or plug-in that operates on the network node 101.

Interactive Video Generating Process

FIGS. 7A and 7B combine to provide a flowchart of an embodiment of an interactive video generation method 700 for generating interactive videos 612 configured with text-to-audio. The network node 101 may employ method 700 to generate an interactive video 612 where one or more animations 164 in the interactive video 612 are configured for text-to-audio. This process increases the capabilities of the network node 101 by enabling the network node 101 to present information using audio that is based on text that is associated with animations 164 in the interactive video 612.

At step 702, the scene managing engine 140 receives a video request 112 for a set of video scenes 160. The video request 112 may be configured similar to the video request 112 described in step 402 of FIG. 4. Referring to FIG. 8 as an example, the video request 112 may comprise animation instructions 204 for one or more video scenes 160. The animation instructions 204 identify one or more animations 164 that are presented during a video scene 160. For example, the animation instructions 204 may comprise source scene IDs 134 that identify video scenes 160 and animation IDs 1102 that identify animations 164 corresponding with each video scene 160. Each animation 164 may comprise one or more interactive HTML elements 802. In other examples, the video request 112 may further comprise any other suitable type or combination of information associated with a video scene 160.

Returning to FIG. 7A at step 704, the scene managing engine 140 identifies a video scene 160 from among the set of video scenes 160. Here, the scene managing engine 140 iteratively selects video scenes 160 from the set of video scenes 160 in the video request 112 to determine whether the video scene 160 contains any animations 164 that are configured for text-to-audio. For example, the scene managing engine 140 may identify a source scene ID 134 for a video scene 160 from among the set of video scenes 160.

At step 706, the scene managing engine 140 identifies an animation 164 associated with the identified video scene 160. In some cases, the identified video scene 160 may comprise multiple animations 164. In this case, the scene managing engine 140 iteratively selects animations 164 that are associated with the identified video scene 160 to determine whether the selected animation 164 is configured for text-to-audio. For example, the scene managing engine 140 may identify an animation ID 1102 for an animation 164 that is associated with the identified video scene 160.

At step 708, the scene managing engine 140 determines whether the identified animation 164 is configured for text-to-audio. Here, the scene managing engine 140 checks the video request 112 to determine whether the identified animation 164 comprises any elements 802 that indicate that the animation 164 is configured for text-to-audio. In the video request 112, the animation 164 may comprise a text-to-audio flag 902 or indicator that indicates whether the animation 164 is configured for text-to-audio. Referring to the portion of a video request 112 shown in FIG. 9 as an example, the animation 164 comprises a first element 802A with a first text-to-audio flag 902A that indicates that the first element 802A is configured for text-to-audio. In this example, the first text-to-audio flag 902A uses a Boolean value to indicate that the first element 802A is configured for text-to-audio. As another example, the animation 164 further comprises a second element 802B with a second text-to-audio flag 902B that indicates that the second element 802B is configured for text-to-audio. In this example, the second text-to-audio flag 902B references another element to indicate that the second element 802B is configured for text-to-audio. As another example, the animation 164 further comprises a third element 802C with a third text-to-audio flag 902C that indicates that the third element 802C is configured for text-to-audio. In this example, the third text-to-audio flag 902C uses user-defined text to indicate that the third element 802C is configured for text-to-audio. In other examples, an animation 164 may use any other suitable type of text-to-audio flag 902 or indicator to indicate whether an element 802 of the animation 164 is configured for text-to-audio.

Returning to FIG. 7A, the scene managing engine 140 proceeds to step 718 in response to determining that the identified animation 164 is not configured for text-to-audio. In this case, the scene managing engine 140 does not need to convert any text associated with the identified animation 164 into an audio sample 610 because none of the elements 802 of the animation 164 are configured for text-to-audio. The scene managing engine 140 proceeds to step 718 to determine if any other animations 164 associated with the video scene 160 comprise elements 802 that are configured for text-to-audio.

Returning to step 708, the scene managing engine 140 proceeds to step 710 in response to determining that one or more elements 802 of the identified animation 164 are configured for text-to-audio. In this case, the scene managing engine 140 proceeds to step 710 to extract the text associated with the identified animation 164 so that it can be converted into an audio sample 610. At step 710, the scene managing engine 140 identifies text associated with the identified animation 164. Returning to the example in FIG. 9, the first text-to-audio flag 902A indicates that first element 802A itself contains the text to extract. For instance, the first element 802A may comprise text information that is presented to a user. In this case, the scene managing engine 140 extracts the text information so that it can be converted into an audio sample 610. As another example, the second text-to-audio flag 902B references another element 802 that contains text. In this case, the scene managing engine 140 extract the text information from the referenced element 802 so that it can be converted into an audio sample 610. As another example, the third text-to-audio flag 902C comprises user-defined text. In this case, the scene managing engine 140 extracts the user-defined text so that it can be converted into an audio sample 610.

Returning to FIG. 7A at step 712, the scene managing engine 140 determines whether the identified animation 164 is in parallel with another animation 164 associated with the identified video scene 160. An animation 164 is in parallel with another animation 164 when the animation 164 is configured to play at least partially at the same time as another animation 164. For example, a first animation 164 and a second animation 164 are in parallel with each other when the second animation 164 begins to play before the first animation 164 has finished playing. In other words, both the first animation 164 and the second animation 164 are played at least partially simultaneously. Referring to FIG. 10 as an example, a first element 802D and a second element 802E each comprise a parallel flag 1002 that indicates that the first element 802D and the second element 802E are in parallel with each other. In this example, the parallel flag 1002 uses a Boolean value to indicate whether an element 802 is in parallel with another element 802. In other examples, any other suitable type of parallel flag 1002 or indicator may be used to indicate whether an element 802 is in parallel with another element 802.

Returning to FIG. 7A, the scene managing engine 140 proceeds to step 714 in response to determining that the identified animation 164 is not in parallel with another animation 164 associated with the identified video scene 160. At step 714, the scene managing engine 140 creates a text-to-audio request 608 with the text associated with the identified animation 164. For example, the text-to-audio request 608 comprises the text associated with the animation 164 that is identified in step 710. In some embodiments, the text-to-audio request 608 may be associated with one or more animation IDs that corresponds with the animations 164 associated with the text-to-audio request 608.

Returning to step 712, the scene managing engine 140 proceeds to step 716 in response to determining that the identified animation 164 is in parallel with another animation 164 associated with the video scene 160. In this case, the scene managing engine 140 combines the text from any animations 164 that are in parallel with each other into a single text-to-audio request 608. At step 716, the scene managing engine 140 appends the text associated with the identified animation 164 to the previous text-to-audio request 608. By combining the text from the animations 164 into a single text-to-audio request 608, the scene managing engine 140 is able to obtain an audio sample 610 that includes audio for all of the animations 164 associated with the text-to-audio request 608. For example, the audio sample 610 may comprise multiple audio segments that correspond with each animation 164. The multiple audio segments are appended to each other in the order that the animations 164 are scheduled to be played. This allows the audio sample 610 to be played as one audio track while multiple animations 164 are playing. In other examples, the scene managing engine 140 may be configured to generate a separate text-to-audio request 608 for each animation 164.

At step 718, the scene managing engine 140 determines whether there are any more animations 164 associated with the video scene 160. Here, the scene managing engine 140 uses the information provided by the video request 112 to determine whether there are any more animations 164 associated with the video scene 160. The scene managing engine 140 returns to step 706 to identify another animation 164 in response to determining that there are more animations 164 associated with the video scene 160. In this case, the scene managing engine 140 continues determining whether other animation 164 associated with the video scene 160 are configured for text-to-audio. Otherwise, the scene managing engine 140 proceeds to step 720 in response to determining that there are no more animations 164 associated with the video scene 160 to analyze.

At step 720, the scene managing engine 140 determines whether there are any more video scenes 160 in the set of video scenes 160. Here, the scene managing engine 140 uses the information provided by the video request 112 to determine whether there are any more video scenes 160 in the set of video scenes 160 to be analyzed. The scene managing engine 140 returns to step 704 to identify another video scene 160 that is associated with the video scene 160 in response to determining that there are more video scenes 160 in the set of video scenes 160 to analyze. In this case, the scene managing engine 140 identifies another video scene 160 from among the set of video scenes 160 to determine whether the video scene 160 contains any animations 164 that are configured for text-to-audio. Otherwise, the scene managing engine 140 proceeds to step 722 in response to determining that there are no more video scenes 160 in the set of video scenes 160 to analyze.

Referring to FIG. 7B at step 722, the scene managing engine 140 converts the text from text-to-audio requests 608 into audio samples 610. In one embodiment, the scene managing engine 140 sends text-to-audio requests 608 to the text-to-audio converter 604 using an Application Programming Interface (API) when the text-to-audio converter 604 is implemented by a network device that is external from the network node 101 that implements the scene managing engine 140. For example, the scene managing engine 140 may establish a web socket connection with the text-to-audio converter 604 to send messages and commands to the text-to-audio converter 604. In this example, the scene managing engine 140 receives audio samples 610 from the text-to-audio converter 604 in response to sending text-to-audio requests 608 to the text-to-audio converter 604.

In another embodiment, the scene managing engine 140 may employ a natural language processing to convert text within a text-to-audio request 608 into an audio sample 610. For example, the scene managing engine 140 may employ a natural language processor application or plug-in that is installed on the network node 101. The scene managing engine 140 may be configured to input text from a text-to-audio request 608 into the natural language processor and to receive an audio sample 610 from the natural language processor in response to providing the input text. In other embodiments, the scene managing engine 140 may convert the text-to-audio requests 608 into audio samples 610 using any other suitable technique. The scene managing engine 140 may repeat the process described step 722 for all of the text-to-audio requests 608 that are associated with the set of video scenes 160.

Once the text from the text-to-audio requests 608 is converted into audio samples 610, the scene managing engine 140 then associates the audio samples 610 with their corresponding animations 164. At step 724, the scene managing engine 140 identifies a video scene 160 from the set of video scenes 160. Here, the scene managing engine 140 iteratively selects video scenes 160 from the set of videos scenes 160.

At step 726, the scene managing engine 140 identifies an animation 164 associated with the identified video scene 160. Here, the scene managing engine 140 iteratively selects animations 164 that are associated with the identified video scene 160 to determine whether the animation 164 should be associated with an audio sample 610.

At step 728, the scene managing engine 140 determines whether the identified animation 164 is associated with a text-to-audio request 608. For example, the scene managing engine 140 may determine whether an animation ID 1102 for the animation 164 was associated with a text-to-audio request 608 in step 714. The scene managing engine 140 proceeds to step 736 in response to determining that the identified animation 164 is not associated with a text-to-audio request 608. In this case, the scene managing engine 140 proceeds to step 736 since the animation 164 does not need to be associated with an audio sample 610. Otherwise, the scene managing engine 140 proceeds to step 730 in response to determining that the identified animation 164 is associated with a text-to-audio request 608. In this case, the scene managing engine 140 proceeds to step 730 to associate the animation 164 with an audio sample 610.

At step 730, the scene managing engine 140 associates the identified animation 164 with a corresponding audio sample 610. The scene managing engine 140 identifies the audio sample 610 that corresponds with a text-to-audio request 608 that was used to request the audio sample 610 and associated the animation 164 with the audio sample 610. The scene managing engine 140 stores associations between animations 164 and audio samples 610 in an audio sample buffer 1100. Referring to FIG. 11 as an example, the audio sample buffer 1110 comprises a plurality of audio samples 610 that are each associated with one or more animation IDs 1102. The scene managing engine 140 identifies the animation ID 1102 that is associated with a text-to-audio request 608 that is used to generate an audio sample 610 and stores an association between the identified animation ID 1102 and the audio sample 610 in the audio sample buffer 1110.

Returning to FIG. 7B at step 732, the scene managing engine 140 determines whether the next scheduled animation 164 for the video scene 160 is also associated with a text-to-audio request 608. The scene managing engine 140 determines whether an animation ID 1102 for the next scheduled animation 164 for the video scene 160 was also associated with a text-to-audio request 608 in step 714. The scene managing engine 140 proceeds to step 736 in response to determining that the next scheduled animation 164 for the video scene 160 is not associated with a text-to-audio request 608. Otherwise, the scene managing engine 140 proceeds to step 734 in response to determining that the next animation 164 for the video scene 160 is associated with a text-to-audio request 608.

At step 734, the scene managing engine 140 adjusts a time duration for the identified animation 164. In this case, the scene managing engine 140 adjusts the time duration for the identified animation 164 to ensure that the time duration associated with the animation 164 accounts for any extra time necessary for the audio sample 610. For example, the animation 164 may be originally associated with a time duration of five seconds which corresponds with a play time for the animation 164. The audio sample 610 that is associated with the animation 164 may have a play time of ten seconds. In this example, the time duration that is associated with the animation 164 is increased from five seconds to ten seconds to provide enough time for the audio sample 610 to finish playing before the next animation 164 begins to play. The scene managing engine 140 may omit step 734 when the time duration associated with the animation 164 is greater than or equal to the play time of the audio sample 610.

At step 736, the scene managing engine 140 adds an entry for identified animation 164 to a video timing map 1200. The video timing map 1200 may be configured similar to the video timing map described in Table 3 and in step 414 of FIG. 4. Referring to FIG. 12 as an example, the video timing map 1200 may comprise a plurality of timestamps 1202 that are each associated with a source scene ID 134 and an animation ID 1102. In this example, the timestamp 1202 corresponds with a start time for an animation 164 corresponding with the source scene ID 134 and the animation ID 1102. In one embodiment, the timestamp 1202 is associated with the time duration for an animation 164. For example, a first entry in the video timing map 1200 may indicate that the first animation 164 for the first video scene 160 is scheduled to begin playing at zero seconds. The first animation 164 may be associated with a time duration of two seconds which corresponds with the play time for the animation 164 and any associated audio samples 610. This means that the timestamp 1202 for the second entry in the video timing map 1200 for the next scheduled animation 164 will indicate that the next animation 164 for the first scene 160 is scheduled to begin playing at two seconds. The scene managing engine 140 may add an entry for the identified animation 164 in a video timing map 1200 by first determining a timestamp 1202 for the animation 164 and then adding the timestamp 1202, the source scene ID 134, and the animation ID 1102 for the animation 164 to the video timing map 1200.

Returning to FIG. 7B at step 738, the scene managing engine 140 determines whether there are any more animations 164 associated with the identified video scene 160. Here, the scene managing engine 140 uses the information provided by the video request 112 to determine whether there are any more animations 164 associated with the video scene 160. The scene managing engine 140 returns to step 726 to identify another animation 164 associated with the video scene 160 in response to determining that there are more animations 164 associated with the identified video scene 160. In this case, the scene managing engine 140 identifies other animations 164 associated with the video scene 160 to determine whether any other animations 164 are associated with an audio sample 610. Otherwise, the scene managing engine 140 proceeds to step 740 in response to determining that there are no more animations 164 associated with the identified video scene 160 to analyze.

At step 740, the scene managing engine 140 determines whether there are any more video scenes 160 in the set of video scenes 160 to analyze. Here, the scene managing engine 140 uses the information provided by the video request 112 to determine whether there are any more video scenes 160 in the set of video scenes 160 to be analyzed. The scene managing engine 140 returns to step 724 to identify another video scene 160 from among the set of video scenes 160 in response to determining that there are more video scenes 160 in the set of video scenes 160 to analyze. In this case, the scene managing engine 140 identifies another video scene 160 from among the set of video scenes 160 to determine whether the video scene 160 contains any animations 164 that need to be associated with an audio sample 610. Otherwise, the scene managing engine 140 proceeds to step 742 in response to determining that there are no other video scenes 160 in the set of video scenes 160 to analyze.

At step 742, the scene managing engine 140 renders the set of video scenes 160. Here, the scene managing engine 140 renders the set of video scenes 160 to generate an interactive video 612 that can be outputted or presented on a user device 602. The interactive video 612 includes animations 164 and corresponding audio samples 610 that are embedded in the video scenes 160. Examples of a rendering process is described in FIGS. 4 and 13.

Interactive Video Playing Process

FIG. 13 is a flowchart of an embodiment of an interactive video playing method 1300 with text-to-audio. The network node 101 may employ method 1300 to render and play an interactive video 612 where one or more animations 164 in the interactive video 612 are configured with text-to-audio. For example, the network node 101 may generate an interactive video 612 using a process similar to the process described in FIGS. 7A and 7B and may provide the interactive video 612 to a user device 602 to be played for a user. The network node 101 may employ method 1300 when the user begins playing or interacting with the interactive video 612.

At step 1302, the playback engine 150 determines a time on a progress bar 308. The progress bar 308 may be generated and configured similar to the progress bar 308 described in FIGS. 3-5. In one embodiment, the playback engine 150 may determine the time on the progress bar 308 corresponds with the beginning of an interactive video 612 when a user initially loads and starts playing the interactive video 612. For example, the playback engine 150 may determine the time on the progress bar 308 corresponds with zero seconds when the user presses the play button after loading the interactive video 612. In another embodiment, the playback engine 150 may determine the time on the progress bar 308 based on the user's interaction with the progress bar 308. For example, the user may manually seek a particular time on the progress bar 308 by fast forwarding or rewinding the interactive video 612. In this example, the playback engine 150 determines a time that corresponds with the starting time indicated by the user on the progress bar 308.

At step 1304, the playback engine 150 identifies the closest video scene 160 to the indicated time on the progress bar 308. The playback engine 150 uses a video timing map 1200 that is associated with the interactive video 612 to determine which video scene 160 is scheduled closest to the indicated time on the progress bar 308. Referring to FIG. 12 as an example, the determined time on the progress bar 308 may have a value of nine seconds. In FIG. 12, the video timing map 1200 does not contain a timestamp 1202 entry at nine seconds. In this case, the playback engine 150 identifies the timestamp 1202 entry that immediately precedes the determined time on the progress bar 308 when the video timing map 1200 does not contain a timestamp 1202 entry that matches the indicated time on the progress bar 308. In this example, the playback engine 150 identifies the timestamp 1202 entry at eight seconds which indicates that the video scene 160 associated with source scene ID "sID:1" is scheduled to play. After identifying the closest scheduled video scene 160, the scene managing engine 140 loads and plays the identified video scene 160.

Returning to FIG. 13 at step 1306, the playback engine 150 identifies the closest animation 164 to the time on the progress bar 308. The playback engine 150 uses the video timing map 1200 that is associated with the interactive video 612 to identify which animation 164 is scheduled closest to the indicated time on the progress bar 308. Continuing with the previous example in FIG. 12, the playback engine 150 determines that the timestamp 1202 entry at eight seconds, which is the closest timestamp 1202 entry to the determined time on the progress bar 308, indicates that the animation 164 associated with animation ID 5 is scheduled to play.

Returning to FIG. 13 at step 1308, the playback engine 150 determines whether the identified video scene 160 has any animations 164 that are scheduled to play before the identified animation 164. This allows to playback engine 150 to ensure that the video scene 160 is properly configured with other animations 164 before playing the identified animation 164. The playback engine 150 uses the video timing map 1200 to determine whether there are any animations 164 scheduled to play before the identified animation 164. Continuing with the previous example in FIG. 12, the playback engine 150 determines that the identified video scene 160 is configured to have four other animations 164 (i.e. the animations 164 associated with animation IDs 1-4) play before the identified animation 164 is played based on the video timing map 1200.

Returning to FIG. 13, the playback engine 150 proceeds to step 1310 in response to determining that the identified video scene 160 has animations 164 scheduled before the identified animation 164. At step 1310, the playback engine 150 plays all the animations 164 that are scheduled before the identified animation 164. In this case, the playback engine 150 loads the video scene 160 and plays any other scheduled animations 164 to properly configure the video scene 160 before playing the identified animation 164.

Returning to step 1308, the playback engine 150 proceeds to step 1312 in response to determining that the identified video scene 160 does not have any animations 164 scheduled before the identified animation 164. In this case, the playback engine 150 determines that the video scene 160 and the identified animation 164 can be loaded and played without playing any other animations 164 before playing the identified animation 164.

At step 1312, the playback engine 150 determines whether the identified video scene 160 has background audio. Here, the playback engine 150 determines whether the video scene 160 is configured to play background audio. For example, the playback engine 160 determines whether the identified video scene 160 is associated with an audio sample (e.g. background music) that is configured to be played while playing the video scene 160. The playback engine 150 proceeds to step 1314 in response to determining that the identified video scene 160 has background audio. At step 1314, the playback engine 150 plays the background audio. For example, the playback engine 150 plays background music that is configured to be played while presenting the identified video scene 160.

Returning to step 1312, the playback engine 150 proceeds to step 1316 in response to determining that the identified video scene 160 does not have any background audio. In this case, the playback engine 150 determines that no background audio should be played while presenting the identified video scene 160. At step 1316, the playback engine 150 plays the identified animation 164.

At step 1318, the playback engine 150 determines whether the identified animation 164 is configured for text-to-audio. In one embodiment, the playback engine 150 determines whether the animation ID 1102 associated with the identified animation 164 is present in the audio sample buffer 1100 that is associated with the interactive video 612. For example, the playback engine 150 may compare the animation ID 1102 for the identified animation 164 to animation IDs 1102 in the audio sample buffer 1100. The playback engine 150 determines that the identified animation 164 is configured for text-to-audio when the animation ID 1102 for the identified animation 164 matches an animation ID 1102 in the audio sample buffer 1100. The playback engine 150 determines that the identified animation 164 is not configured for text-to-audio when the animation ID 1102 for the identified animation 164 does not match an animation ID 1102 in the audio sample buffer 1100. The playback engine 150 proceeds to step 1326 in response to determining that the identified animation 164 is not configured for text-to-audio. In this case, the playback engine 150 plays the identified animation 164 without an accompanying audio sample 610 since the animation 164 is not configured for text-to-audio.

Otherwise, the playback engine 150 proceeds to step 1320 in response to determining that the identified animation 164 is configured for text-to-audio. In this case, the playback engine 150 identifies an audio sample 610 that is associated with the identified animation 164 and prepares the video scene 160 to play the identified audio sample 610 with the animation 164.

At step 1320, the playback engine 150 reduces the volume of any background audio when background audio is playing for the video scene 160. Here, the playback engine 150 reduces the volume of the background audio to a suitable level that allows an audio sample 610 associated with the identified animation 164 to be heard over the background audio. For example, the playback engine 150 may reduce the volume of the background audio by 50%, 75%, 80%, or any other suitable percentage. The playback engine 150 may omit step 1320 when no background audio is playing for the video scene 160.

At step 1322, the playback engine 150 identifies the audio sample 610 that is associated with the identified animation 164. For example, the playback engine 150 may use the animation ID 1102 for the identified animation 164 to identify a corresponding audio sample 610 that is linked with the animation ID 1102 in the audio sample buffer 1100. At step 1324, the playback engine 150 plays the identified audio sample 610 while playing the animation 164.

At step 1326, the playback engine 150 determines whether there are any more animations 164 associated with the identified video scene 160. Here, the playback engine 150 uses information from the video timing map 1200 to determine whether there are any other animations 164 left to play for the identified video scene 160. The playback engine 150 proceeds to step 1328 to identify the next scheduled animation 164 that is associated with the identified video scene 160. At step 1328, the playback engine 150 identifies another animation 164 that is associated with the identified video scene 160. Here, the playback engine 150 identifies the next animation 164 that is scheduled to play according the video timing map 1200.

Returning to step 1326, the playback engine 150 proceeds to step 1330 in response to determining that there are no more scheduled animations 164 associated with the identified video scene 160. At step 1330, the playback engine 150 determines whether there are any more video scenes 160 left to play. Here, the playback engine 150 uses information from the video timing map 1200 to determine whether there are any other video scenes 160 left to play for the interactive video 612. The playback engine 150 proceeds to step 1332 in response to determining that there are additional video scenes 160 left to play. At step 1332, the playback engine 150 identifies another video scene 160 from among a set of video scenes 160 to play. Here, the playback engine 150 identifies and plays the next video scene 160 that is scheduled to play according the video timing map 1200.

Returning to step 1330, the playback engine 150 terminates method 1300 in response to determining that there are no more video scenes 160 left to play. In this case, the playback engine 150 completes playback of the interactive video 612 when there are no more video scenes 160 left to play.

Hardware Configuration

FIG. 14 is a schematic diagram of an embodiment of network device 101 configured to create and play an interactive video using a markup language. The network node 101 comprises a processor 1402, a memory 1404, and a network interface 1406. The network device 101 may be configured as shown or in any other suitable configuration.

The processor 1402 comprises one or more processors operably coupled to the memory 1404. The processor 1402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 1402 may be a programmable logic device, a microcontroller, a microprocessor, or any suitable combination of the preceding. The processor 1402 is communicatively coupled to and in signal communication with the memory 1404. The one or more processors are configured to process data and may be implemented in hardware or software. For example, the processor 1402 may be 8-bit, 16-bit, 32-bit, 64-bit or of any other suitable architecture. The processor 1402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a source scene database 130, a scene managing engine 140, and a playback engine 150. In this way, processor 1402 may be a special purpose computer designed to implement function disclosed herein. In an embodiment, the source scene database 130, the scene managing engine 140, and the playback engine 150 are each implemented using logic units, FPGAs, ASICs, DSPs, or any other suitable hardware.

The source scene database 130, the scene managing engine 140, and the playback engine 150 are configured similar to the source scene database 130, the scene managing engine 140, and the playback engine 150 described in FIGS. 1-13, respectively. For example, the scene managing engine 140 may be configured to perform the steps of method 700 described in FIGS. 7A and 7B. The playback engine 150 may be configured to perform the steps of methods 400, 500, and 1300 described in FIGS. 4, 5, and 13, respectively.

The memory 1404 comprises one or more disks, tape drives, or solid-state drives, and may be used as an over-flow data storage device, to store programs when such programs are selected for execution, and to store instructions and data that are read during program execution. The memory 1404 may be volatile or non-volatile and may comprise read-only memory (ROM), random-access memory (RAM), ternary content-addressable memory (TCAM), dynamic random-access memory (DRAM), and static random-access memory (SRAM). The memory 1404 is operable to store source scene database instructions 1408, scene managing instructions 1410, playback instructions 1412, scene timing maps 1414, video timing maps 1200, data 1416, audio sample buffer 1100, and/or any other data or instructions. The source scene database instructions 1408, the scene managing instructions 1410, and the playback instructions 1412 may comprise any suitable set of instructions, logic, rules, or code operable to execute the source scene database 130, the scene managing engine 140, and the playback engine 150, respectively. The scene timing maps 1414 and the video timing maps 1200 are the same as the scene timing maps and the video timing maps 1200 described in FIGS. 4, 7A, 7B, and 13. Data 1418 may comprise source scenes 132, scene collections 170, video scenes 160, HTML elements 162, animations 164, audio 166, transition effects 168, audio samples 610, text files, documents, images, video files, or any other suitable type of data.

The network interface 1406 is configured to enable wired and/or wireless communications. The network interface 1406 is configured to communicate data between network nodes 101 in the system 100 and/or any other system or domain. For example, the network interface 1406 may comprise a WIFI interface, a local area network (LAN) interface, a wide area network (WAN) interface, a modem, a switch, or a router. The processor 1402 is configured to send and receive data using the network interface 1406. The network interface 1406 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An interactive video generating device, comprising:
a memory operable to store:
　a video timing map comprising a plurality of timestamps, wherein each timestamp is associated with a source scene identifier for a video scene and an animation identifier for an animation; and
　an audio sample buffer comprising a plurality of audio samples, wherein each audio sample is associated with an animation identifier; and
a processor operably coupled to the memory, configured to:
　receive a video request comprising animation instructions for a video scene, wherein:
　　the animation instructions identify one or more animations associated with the video scene; and
　　each animation comprises a Hypertext Markup Language (HTML) element;
　identify a first animation from the one or more animations associated with the video scene, wherein the first animation is associated with text;
　identify a text-to-audio flag associated with the first animation in the video request, wherein:
　　the text-to-audio flag indicates the first animation is configured for text-to-audio; and
　　the text-to-audio flat identifies a second animation within the video scene;
　determine the first animation is configured for text-to-audio based on the text-to-audio flag;
　identify text associated with the first animation, wherein identifying the text associated with the first animation comprises:
　　identifying text within the second animation; and
　　extracting the text from the second animation;
　convert the text associated with the first animation into an audio sample;
　identify an animation identifier associated with the first animation;
　store an association between the audio sample and the animation identifier for the first animation in the audio sample buffer;
　identify a source scene identifier associated with the video scene; and
　add an entry in the video timing map for the first animation that associates a timestamp with the source scene identifier for the video scene and the animation identifier for the first animation, wherein the timestamp identifies a scheduled time for playing the first animation.

2. The device of claim 1, wherein the processor is further configured to render the video scene in the form of an HTML page, wherein the video scene comprises the first animation embedded in the video scene.

3. The device of claim 1, wherein converting the text associated with the first animation into the audio sample comprises:
　sending the text associated with the first animation to a text-to-audio converter; and
　receiving the audio sample in response to sending the text associated with the first animation to the text-to-audio converter.

4. The device of claim 1, wherein the processor is further configured to:
　identify a third animation from the set of animations associated with the video scene;
　determine the third animation is configured to be presented in parallel with the first animation; and
　wherein converting the text associated with the first animation into the audio sample comprises:
　　sending a text-to-audio request to a text-to-audio converter, wherein the text-to-audio request comprises:
　　　the text associated with the first animation; and
　　　text associated with the third animation; and
　　receiving the audio sample in response to sending the text-to-audio request to the text-to-audio converter, wherein the audio sample comprises audio for the first animation and the third animation.

5. The device of claim 1, wherein associating the timestamp with the first animation in the video timing map further comprises associating a time duration with the first animation.

6. The device of claim 1, wherein:
　associating the timestamp with the first animation in the video timing map further comprises associating a time duration with the first animation; and
　the processor is further configured to:
　　identify a third animation from the set of animations associated with the video scene;
　　determine the third animation is configured to be presented in parallel with the first animation; and
　　increase the time duration associated with the first animation in response to determining that the third animation is configured to be presented in parallel with the first animation.

7. An interactive video generating method, comprising:
receiving a video request comprising animation instructions for a video scene, wherein:
　the animation instructions identify one or more animations associated with the video scene; and
　each animation comprises a Hypertext Markup Language (HTML) element;
identifying a first animation from the one or more animations associated with the video scene, wherein the first animation is associated with text;
identifying a text-to-audio flag associated with the first animation in the video request, wherein:
　the text-to-audio flag indicates the first animation is configured for text-to-audio; and
　the text-to-audio flag identifies a second animation within the video scene;
determining the first animation is configured for text-to-audio based on the text-to-audio flag;

identifying text associated with the first animation, wherein identifying the text associated with the first animation comprises:
  identifying text within the second animation; and
  extracting the text from the second animation;
converting the text associated with the first animation into an audio sample;
identifying an animation identifier associated with the first animation;
storing an association between the audio sample and the animation identifier for the first animation in an audio sample buffer, wherein:
  the audio sample buffer comprising a plurality of audio samples; and
  each audio sample is associated with an animation identifier;
identifying a source scene identifier associated with the video scene; and
adding an entry in a video timing map for the first animation that associates a timestamp with the source scene identifier for the video scene and the animation identifier for the first animation, wherein:
  the timestamp identifies a scheduled time for playing the first animation;
  the video timing map comprises a plurality of timestamps; and
  each timestamp is associated with a source scene identifier for a video scene and an animation identifier for an animation.

8. The method of claim 7, further comprising rendering the video scene in the form of an HTML page, wherein the video scene comprises the first animation embedded in the video scene.

9. The method of claim 7, wherein converting the text associated with the first animation into the audio sample comprises:
  sending the text associated with the first animation to a text-to-audio converter; and
  receiving the audio sample in response to sending the text associated with the first animation to the text-to-audio converter.

10. The method of claim 7, further comprising:
  identifying a third animation from the set of animations associated with the video scene;
  determining the third animation is configured to be presented in parallel with the first animation; and
  wherein converting the text associated with the first animation into the audio sample comprises:
    sending a text-to-audio request to a text-to-audio converter, wherein the text-to-audio request comprises:
      the text associated with the first animation; and
      text associated with the third animation; and
    receiving the audio sample in response to sending the text-to-audio request to the text-to-audio converter, wherein the audio sample comprises audio for the first animation and the third animation.

11. The method of claim 7, wherein associating the timestamp with the first animation in the video timing map further comprises associating a time duration with the first animation.

12. The method of claim 7, wherein:
  associating the timestamp with the first animation in the video timing map further comprises associating a time duration with the first animation; and
  further comprising:
    identifying a third animation from the set of animations associated with the video scene;
    determining the third animation is configured to be presented in parallel with the first animation; and
    increasing the time duration associated with the first animation in response to determining that the second animation is configured to be presented in parallel with the first animation.

13. A computer program comprising executable instructions stored in a non-transitory computer readable medium that when executed by a processor causes the processor to:
  receive a video request comprising animation instructions for a video scene, wherein:
    the animation instructions identify one or more animations associated with the video scene; and
    each animation comprises a Hypertext Markup Language (HTML) element;
  identify a first animation from the one or more animations associated with the video scene, wherein the first animation is associated with text;
  identify a text-to-audio flag associated with the first animation in the video request, wherein:
    the text-to-audio flag indicates the first animation is configured for text-to-audio; and
    the text-to-audio flat identifies a second animation within the video scene;
  determine the first animation is configured for text-to-audio based on the test-to-audio flag;
  identify text associated with the first animation, wherein identifying the text associated with the first animation comprises:
    identifying text within the second animation; and
    extracting the text from the second animation;
  convert the text associated with the first animation into an audio sample;
  identify an animation identifier associated with the first animation;
  store an association between the audio sample and the animation identifier for the first animation in an audio sample buffer, wherein:
    the audio sample buffer comprising a plurality of audio samples; and
    each audio sample is associated with an animation identifier;
  identify a source scene identifier associated with the video scene; and
  add an entry in a video timing map for the first animation that associates a timestamp with the source scene identifier for the video scene and the animation identifier for the first animation, wherein:
    the timestamp identifies a scheduled time for playing the first animation;
    the video timing map comprises a plurality of timestamps; and
    each timestamp is associated with a source scene identifier for a video scene and an animation identifier for an animation.

14. The computer program of claim 13, further comprising instructions that when executed by the processor causes the processor to render the video scene in the form of an HTML page, wherein the video scene comprises the first animation embedded in the video scene.

15. The computer program of claim 13, wherein converting the text associated with the first animation into the audio sample comprises:
  sending the text associated with the first animation to a text-to-audio converter; and receiving the audio sample in response to sending the text associated with the first animation to the text-to-audio converter.

16. The computer program of claim 13, further comprising instructions that when executed by the processor causes the processor to:
   identify a third animation from the set of animations associated with the video scene;
   determine the third animation is configured to be presented in parallel with the first animation; and
   wherein converting the text associated with the first animation into the audio sample comprises:
      sending a text-to-audio request to a text-to-audio converter, wherein the text-to-audio request comprises:
         the text associated with the first animation; and
         text associated with the third animation; and
      receiving the audio sample in response to sending the text-to-audio request to the text-to-audio converter, wherein the audio sample comprises audio for the first animation and the third animation.

17. The computer program of claim 13, wherein associating the timestamp with the first animation in the video timing map further comprises associating a time duration with the first animation.

* * * * *